(12) United States Patent
Jeong et al.

(10) Patent No.: US 10,498,906 B2
(45) Date of Patent: Dec. 3, 2019

(54) METHOD AND APPARATUS FOR ADJUSTING SERVICE LEVEL IN CONGESTION

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR); Youngkyo Baek, Seoul (KR); Hanna Lim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/761,818

(22) PCT Filed: Jan. 20, 2014

(86) PCT No.: PCT/KR2014/000558
§ 371 (c)(1),
(2) Date: Jul. 17, 2015

(87) PCT Pub. No.: WO2014/112843
PCT Pub. Date: Jul. 24, 2014

(65) Prior Publication Data
US 2015/0358483 A1    Dec. 10, 2015

(30) Foreign Application Priority Data

Jan. 18, 2013  (KR) .......................... 10-2013-0006081
Mar. 22, 2013  (KR) .......................... 10-2013-0030770
Oct. 31, 2013  (KR) .......................... 10-2013-0131691

(51) Int. Cl.
*H04M 15/00* (2006.01)
*H04W 8/20* (2009.01)

(52) U.S. Cl.
CPC ....... *H04M 15/8214* (2013.01); *H04M 15/60* (2013.01); *H04W 8/20* (2013.01)

(58) Field of Classification Search
CPC ... H04M 15/8214; H04M 15/60; H04W 4/24; H04W 28/0289; H04W 8/20; H04L 47/20
See application file for complete search history.

(56) References Cited

U.S. PATENT DOCUMENTS 7,680,103 B2   3/2010   Lanzinger et al.
8,982,790 B2   3/2015   Gu
(Continued)

FOREIGN PATENT DOCUMENTS

CN    1930889 A    3/2007
CN    101047516 A   10/2007
(Continued)

OTHER PUBLICATIONS

Japanese Office Action dated Dec. 4, 2017, issued in Japanese patent application No. 2015-553660.
(Continued)

*Primary Examiner* — Tejis Daya
(74) *Attorney, Agent, or Firm* — Jefferson IP Law, LLP

(57) ABSTRACT

A method for managing congestion in a base station in a mobile communication system according to one embodiment of the present invention comprises the steps of: requesting user subscription information to a mobility management entity (MME); receiving the user subscription information from the MME; and performing a congestion control in a communication between terminals on the basis of the received user subscription information. According to the embodiment, action may be taken in consideration of the user information and a current congestion state when controlling the congestion in a wireless communication system, and thus side effects resulting from the congestion control (Continued)

may be reduced. Further, the present invention provides a method and device for not charging for dropped packets when performing a packet drop, and thus the congestion control may be performed more easily. Also, the present invention has an advantage of performing the congestion control, according to the type of packets to which congestion control is applied or the type of application or service which has generated packets, at the time of controlling the congestion, thereby minimizing user's inconvenience due to the congestion control.

10 Claims, 17 Drawing Sheets

(56) References Cited

U.S. PATENT DOCUMENTS

| | | | | |
|---|---|---|---|---|
| 9,191,841 B2 * | 11/2015 | Zakrzewski | | H04W 28/021 |
| 9,331,913 B2 | 5/2016 | Campbell | | |
| 2006/0120473 A1 * | 6/2006 | Baum | | H04L 1/04 |
| | | | | 375/260 |
| 2008/0096523 A1 * | 4/2008 | Lundin | | G06Q 30/04 |
| | | | | 455/406 |
| 2008/0175263 A1 | 7/2008 | Chen et al. | | |
| 2010/0128722 A1 * | 5/2010 | Madour | | H04L 12/66 |
| | | | | 370/352 |
| 2011/0063977 A1 | 3/2011 | Halfmann et al. | | |
| 2011/0141890 A1 * | 6/2011 | Giaretta | | H04W 28/20 |
| | | | | 370/232 |
| 2011/0261695 A1 | 10/2011 | Zhao et al. | | |
| 2012/0051216 A1 * | 3/2012 | Zhang | | H04L 47/12 |
| | | | | 370/230 |
| 2012/0120789 A1 * | 5/2012 | Ramachandran | | |
| | | | | H04W 36/0022 |
| | | | | 370/220 |
| 2012/0189016 A1 * | 7/2012 | Bakker | | H04W 76/021 |
| | | | | 370/401 |
| 2012/0218889 A1 * | 8/2012 | Watfa | | H04W 60/04 |
| | | | | 370/230 |
| 2012/0246325 A1 | 9/2012 | Pancorbo Marcos et al. | | |
| 2012/0307730 A1 | 12/2012 | Gu | | |
| 2013/0051282 A1 * | 2/2013 | Lim | | H04L 12/1403 |
| | | | | 370/259 |
| 2013/0083777 A1 * | 4/2013 | Rydnell | | H04W 36/0022 |
| | | | | 370/331 |
| 2013/0128744 A1 * | 5/2013 | Landais | | H04W 28/0221 |
| | | | | 370/236 |
| 2013/0128816 A1 * | 5/2013 | Li | | H04W 28/20 |
| | | | | 370/328 |
| 2013/0188527 A1 * | 7/2013 | Yang | | H04W 28/22 |
| | | | | 370/259 |
| 2014/0022904 A1 * | 1/2014 | Ahmad | | H04W 28/0231 |
| | | | | 370/235 |
| 2014/0050132 A1 * | 2/2014 | Ronneke | | H04W 76/02 |
| | | | | 370/310 |
| 2014/0119242 A1 * | 5/2014 | Campbell | | H04M 15/39 |
| | | | | 370/259 |
| 2014/0233390 A1 * | 8/2014 | Schmid | | H04L 47/125 |
| | | | | 370/236 |
| 2015/0201394 A1 * | 7/2015 | Qu | | H04W 4/02 |
| | | | | 455/456.1 |
| 2015/0333991 A1 * | 11/2015 | Liu | | H04L 43/0835 |
| | | | | 455/406 |

FOREIGN PATENT DOCUMENTS

| | | |
|---|---|---|
| CN | 102726020 A | 10/2012 |
| CN | 104885409 A | 9/2015 |
| JP | 2012-195898 A | 10/2012 |
| KR | 10-0702858 B1 | 4/2007 |
| WO | 2015/015825 A1 | 2/2005 |
| WO | 2011/063543 A1 | 6/2011 |
| WO | 2011/136589 A2 | 11/2011 |
| WO | WO 2011139072 A2 * | 11/2011 ......... H04L 12/1403 |
| WO | 2012/028972 A1 | 3/2012 |
| WO | 2014/068483 A1 | 5/2014 |

OTHER PUBLICATIONS

Chinese Office Action dated Jan. 3, 2018, issued in Chinese patent application No. 201480016991.0.

* cited by examiner

METHOD AND APPARATUS FOR ADJUSTING SERVICE LEVEL IN CONGESTION

CROSS-REFERENCE TO RELATED APPLICATION(S)

This application claims the benefit under 35. U.S.C. § 371 of an International application filed on Jan. 20, 2014 and assigned application number PCT/KR2014/000558, which claims the benefit of a Korean patent application filed on Jan. 18, 2013 in the Korean Intellectual Property Office and assigned the serial number 10-2013-0006081, a Korean patent application filed on Mar. 22, 2013 in the Korean Intellectual Property Office and assigned the serial number 10-2013-0030770, and a Korean patent application filed on Oct. 31, 2013 in the Korean Intellectual Property Office and assigned the serial number 10-2013-0131691, the entire disclosure of which is hereby incorporated by reference.

TECHNICAL FIELD

The present invention relates to a method and apparatus for adjusting a service level in a congestion state in a wireless communication system, and more particularly, to a method for solving congestion when congestion occurs and a method and apparatus for reducing adverse effects caused by solving the congestion.

BACKGROUND

FIG. 1 illustrates a structure of an LTE mobile communication system.

Referring to FIG. 1, a wireless access network of the LTE mobile communication system includes a next-generation base station (Evolved Node B, EUTRAN, hereinafter, referred to as "eNB" or "NodeB") 110, an MME (Mobility Management Entity) 120, and an S-GW (Serving-Gateway) 130. A user equipment (hereinafter, referred to as "terminal" or "UE") 100 is connected to an external network via the eNB 110, the S-GW 130, and a P-GW (Packet Data Network-Gateway) 160. An AP (Application Function) is a device that exchanges application-related information with a user in the application level. A PCRF (Policy and Charging Rules Function) 150 is a device that controls a policy related to the Quality of Service (QoS) of a user, and a PCC (Policy and Charging Control) rule corresponding to the policy is transferred and applied to the P-GW 160.

The eNB 110 is an RAN (Radio Access Network) node, and corresponds to an RNC (Radio Network Controller) of a UTRAN system and a BSC (Base Station Controller) of a GERAN system. The eNB 110 is connected to the UE 100 via a wireless channel, and performs a similar role to the existing RNC/BSC.

In the LTE system, since all user traffic including a real-time service such as VoIP (Voice over IP) through an Internet protocol (IP) are serviced through a shared channel, a device for collecting and scheduling status information of UEs 100 is needed, and the eNB 110 serves as this device.

The S-GW 130 is an entity to provide data bearers and establishes and releases data bearers under the control of the MME 150. The MME 150 is responsible for various control functions and is connected to a plurality of eNBs.

The PCRF 150 is an entity that generally controls QoS and charging for traffic.

In general, a User Plane (UP) refers to a path connecting the UE 100 to the RAN node, the RAN node to the S-GW 130, and the S-GW 130 to the P-GW 160, through which user data is transmitted and/or received. Of this path, a section that uses a wireless channel with seriously limited resources is a path between the UE 100 and the RAN node.

In a wireless communication system such as LTE, QoS may be applied in units of EPS bearers. One EPS bearer is used to transport IP flows having the same QoS requirements. In the EPS bearers, QoS-related parameters may be designated and include QoS Class Identifier (QCI) and Allocation and Retention Priority (ARP). The EPS bearer corresponds to a PDP context of the GPRS system.

Therefore, there is a need for a method for reducing congestion that may occur due to limitations of resources in a wireless communication system.

SUMMARY

Technical Problem

Therefore, the present invention has been made in view of the above-mentioned problems, and an aspect of the present invention is to provide a method and apparatus in which an Evolved Node B (eNB) may control congestion in consideration of user characteristics or service application, in order to respond to a congestion state while preventing a user quality of experience for service from deteriorating in a Radio Access Network (RAN) congestion state (hereinafter, equally used with a User Plane (UP) congestion state).

Another aspect of the present invention is to provide a method and apparatus in which an eNB may enable a communication network operator for packet to readily impose a charge for a packet to which the congestion control is applied.

Still another aspect of the present invention is to provide a method and apparatus in which a User Equipment (UE) may efficiently perform congestion control through congestion control information in an eNB to which the UE is moved when handover occurs between eNBs.

Yet another aspect of the present invention is to provide a method and apparatus in which an eNB may perform congestion control in accordance with a character of a packet to which the congestion control is applied, when performing the congestion control.

Solution to Problem

In accordance with an aspect of the present invention, there is provided a method for controlling congestion of an Evolved Node B (eNB) in a mobile communication system including: requesting user subscription information from a Mobility Management Entity (MME); receiving the user subscription information from the MME; and performing congestion control in communication with a User Equipment (UE) based on the received user subscription information.

In accordance with another aspect of the present invention, there is provided a method for controlling congestion in an MME of a mobile communication system including: receiving a request for user subscription information from an eNB; and transmitting user subscription information to the eNB based on the request. Here, the eNB may perform congestion control in communication with a UE based on the received user subscription information.

In accordance with still another aspect of the present invention, there is provided an eNB in a mobile communication system including: a transmission/reception unit that requests user subscription information from an MME, and receives the user subscription information from the MME; and a control unit that performs congestion control in communication with a UE based on the received user subscription information.

In accordance with yet another aspect of the present invention, there is provided an MME of a mobile communication system including: a transmission/reception unit that receives a request for user subscription information from an eNB; and a control unit that controls the transmission/reception unit to transmit user subscription information to the eNB based on the request. Here, the eNB may perform congestion control in communication with a UE based on the received user subscription information.

In accordance with further aspect of the present invention, there is provided a method for managing congestion in a UE of a mobile communication system, including: transmitting a policy request message to a User Plane Congestion (UPCON) policy server; receiving, from the UPCON policy server, a policy response message including whether one or more applications corresponding to the policy request message are attended/unattended; generating, by an application executed by the UE, data; and transmitting, to the eNB, the generated data and a signal including whether the generated data is attended/unattended based on the policy response message.

In accordance with further aspect of the present invention, there is provided a method for managing congestion in an eNB of a mobile communication system, including: receiving, from a UE, data generated by an application executed in the UE and a first signal including whether the generated data is attended/unattended; storing information including whether the data generated by the application is attended/unattended based on the received signal; transmitting the data generated by the application to a gateway; receiving, from the gateway, a second signal including data generated by a destination server to correspond to the data generated by the application; and performing congestion control based on the stored information when transmitting the data generated by the server in a case in which a UP is in a congestion state.

In accordance with further aspect of the present invention, there is provided a method for transmitting and receiving data in an eNB of a mobile communication system, including: receiving a data packet from a core network; transmitting the received data packet to a UE; detecting that connection to the UE is unavailable; and transmitting the detection result to the core network. Here, the core network that has received the detection result may change information related to the data packet transmitted to the UE.

In accordance with further aspect of the present invention, there is provided a method for transmitting and receiving data in a core network node of a mobile communication system, including: transmitting a data packet to an eNB; receiving, from the eNB, a message including information about a connection state between the eNB and a UE; and changing information about the transmitted data packet when the connection state is unavailable.

Advantageous Effects

According to embodiments, it is possible to take a measure in consideration of UE context and a current congestion state when performing congestion control in a wireless communication system, thereby reducing side effects due to congestion control.

Also, it is possible to prevent charge imposition for a dropped packet when performing packet drop, thereby more readily performing congestion control.

Also, by performing congestion control in accordance with a type of a packet to which congestion control is applied at the time of congestion control, it is possible to minimize the user's inconvenience due to congestion control.

Also, by receiving attended/unattended information of an application from a policy server, it is possible to perform congestion control in accordance with a character of a packet caused by the application at the time of congestion control.

Also, when a UE fails to receive a data packet, a core network may adjust a transmitted packet or change charging information, by which it is possible to prevent a packet from being dropped in an eNB or the core network and prevent the occurrence of improper charge imposition on a UE.

DETAILED DESCRIPTION

Figure 1:
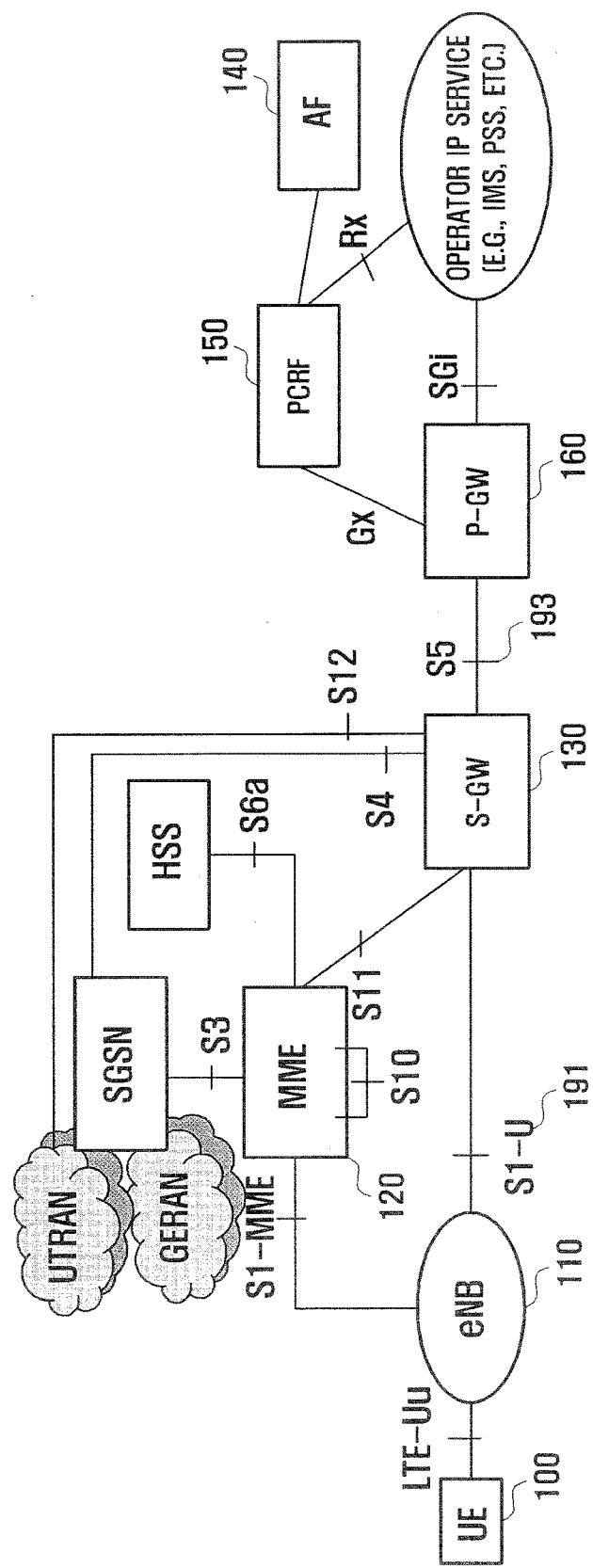
FIG. 1 illustrates a structure of a wireless communication system according to the related art.

Hereinafter, exemplary embodiments of the present invention will be described in detail with reference to the accompanying drawings.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

In the following description of embodiments of the present invention, a detailed description of known functions or configurations incorporated herein will be omitted when it is determined that the detailed description thereof may unnecessarily obscure the subject matter of the present invention.

In addition, in the specific description of the embodiments of the present invention, a basic 3GPP (Third Generation Partnership Project) LTE system is described as a main target, but embodiments of the present invention may also be applicable with some modifications in other communication/computer systems having a similar technical background and system type to the extent not departing significantly from the scope of the present invention, which will be determined by skilled persons with technical knowledge in the art. For example, the present technique using the LTE system as the main target may be applicable even in UTRAN/GERAN systems having a similar system structure. In this case, an ENB (RAN node) may be replaced by RNC/BSC, an S-GW (Serving-Gateway) may be omitted or included in an SGSN (Serving GPRS Support Node), and a P-GW (Packet Data Network-Gateway) may correspond to a GGSN (Gateway GPRS Support Node). In addition, a concept of a bearer of the LTE system may correspond to the PDP context of the UTRAN/GERAN system.

In addition, according to an embodiment, an RAN (Radio Access Network) should transmit and receive data with a user within limited frequencies. When the number of users is increased within a cell controlled by the RAN node, or when an amount of traffic transmitted and received by users is increased, a congestion state may be generated in the RAN. In order to respond to the congestion state without deteriorating a user quality of experience for service in such RAN congestion state (hereinafter, equally used with a User Plane (UP) congestion state), congestion control considering user characteristics or service applications is required. A system component that can autonomously perform an operation corresponding to the congestion state may be a configuration of at least one of a UE (User Equipment), a communication network, and a component that transmits traffic.

When a subject that manages traffic with respect to the congestion state is an RAN (E-UTRAN or eNodeB in the case of the LTE network) within a network, the RAN may perform differential transmission of data packets that satisfy specific conditions or perform an operation of extremely dropping the data packet rather than transmitting the data packet when the congestion state is severe. In this instance, there may occur a case in which, even though an entity (generally P-GW in the case of the LTE network) for collecting transmission information (the number or volume of transmitted packets) of the packet with respect to the UE for the purpose of charge imposition has already generated charging information about the packet, the corresponding packet cannot be transmitted to the RAN due to the congestion state, or service cannot be properly received compared to the charge imposition.

Figure 2:
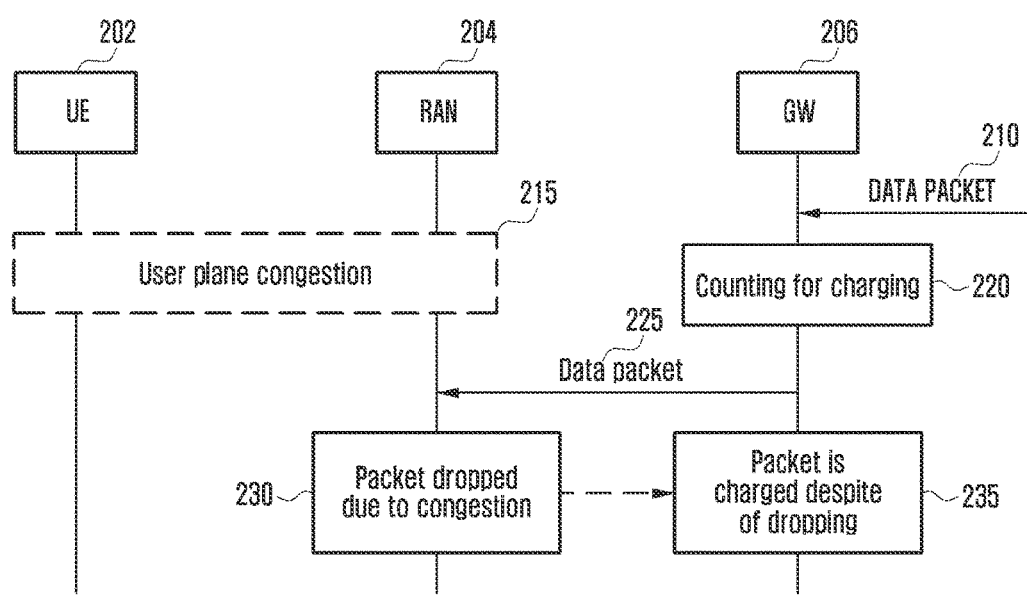
FIG. 2 is a signal flowchart illustrating a congestion state according to an embodiment of the present invention.

FIG. 2 is a signal flowchart illustrating a congestion state according to an embodiment of the present invention.

Referring to FIG. 2, in step 215, it may be assumed that a User Equipment (UE) 202 receives a service in a congested RAN 215.

In step 210, a downlink packet may reach a GW node 206 (S-GW or P-GW, but preferably, P-GW).

In step 220, the GW node 206 (generally, P-GW) that collects charging-related information may generate charging information related to the corresponding packet.

In step 225, the GW node 206 may transmit the packet that has generated the charging information to the RAN node 204.

In step 230, there may occur a case in which the RAN node 204 drops the packet that should be transmitted to the UE 202 whiling failing to transmit the packet to the UE 202 due to congestion, due to a congestion state.

When the packet for which a charge has been already imposed in step 230 is dropped, there may occur a case in which a charge is imposed for the dropped packet although even an attempt to transmit the corresponding packet to the UE 202 has not been made such as in step 235.

In order to address the foregoing problem, the RAN node 204 may apply control such as dropping the packet so long as a problem of the charge imposition on the UE 202 does not occur even though the RAN node 204 applies congestion control.

Figure 3:
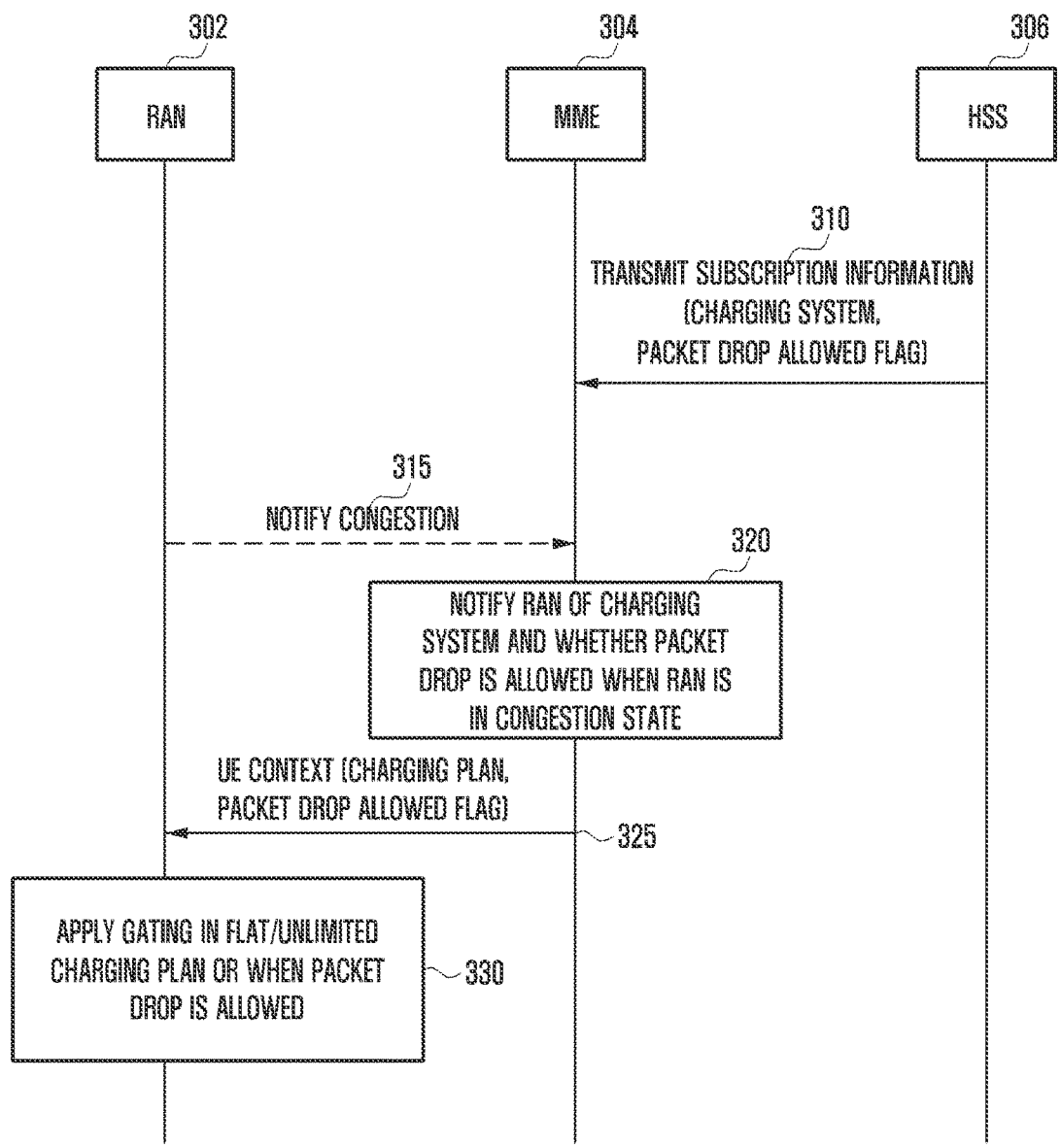
FIG. 3 illustrates a signal flow for performing congestion control according to an embodiment of the present invention.

FIG. 3 illustrates a signal flow for performing congestion control according to an embodiment of the present invention.

Referring to FIG. 3, a user subscription information database (HSS) 306 stores information about a charging type to be applied to a UE, and then also transmits the stored information about the charging type when transmitting user subscription information to a core network node (e.g., MME (Mobility Management Entity) 304). The core network node may enable the corresponding charging type-related information to be included as a part of the UE context transmitted to the RAN node 302, as necessary. The RAN node 302 that has received the UE context may apply a gating operation (dropping the packet rather than transmitting the packet) or differential transmission with respect to the corresponding packet, when no problem occurs even though the corresponding packet is not transmitted but dropped according to the charging type of the UE in a congestion state (e.g., a case of flat charging or flat rate plan, a case of an unlimited charging plan, or a case in which a packet is allowed to be dropped according to setting of a network operator or a user). The foregoing operation may be simply changed to perform an operation of dropping the corresponding packet only when the user subscription information includes information about whether the data packet is allowed to be dropped rather than transmitted from the network to the UE and this information is transmitted to the RAN node 302 and allowed. The charging type and whether the packet is allowed to be dropped may be distinguished per UE or per service. As an example of being distinguished per service, a case in which the charging type and whether the packet is allowed to be dropped is distinguished by at least one of per PDN (Packet Data Network) connection (per APN) and per bearer (per EPS bearer) may be given. For example, when packet drop is allowed only with respect to one EPS bearer according to subscription information transmitted from a subscription information server to the RAN node 302 even though the UE generates two EPS bearers, or when there is no problem in the charging type due to packet drop, the RAN node 302 may apply gating (packet drop) only to the corresponding EPS bearer.

Referring to FIG. 3, in step 310, when transmitting the user subscription information to the MME 304 (updating location ack (acknowledge) or inserting subscription information message), the HSS 306 may enable the charging type and information indicating whether packet drop is allowed to be included in the subscription information, and transmit the user subscription information. According to an embodiment, the charging type may include a charging type applied to the UE. The charging type may include an identifier for identifying flat charging, online charging, offline charging, unlimited data plan, volume-based charging, and the like. The MME 304 may store the received identifier.

The MME 304 may transmit the stored UE context to the RAN node 302, as necessary. Such transmission of the UE context to the RAN node 302 may include a case in which information indicating occurrence of congestion is received from the RAN node 302.

In step 315, the RAN node 302 may notify the MME 304 of the information indicating occurrence of congestion.

In step 320, the MME 304 may determine whether to notify the RAN node 302 of the stored UE context and the information indicating whether packet drop is allowed, based on the message received in step 315. The determination may be performed by a user identifier set in advance or by setting of a network operator.

In step 325, the MME 304 that has determined that the stored UE context and the information indicating that packet drop is allowed can be transmitted may transmit, to the RAN node 302, the stored UE context and the information indicating that packet drop is allowed. According to an embodiment, the MME 304 may enable the stored UE context and the information indicating that packet drop is allowed to be included in the UE context (included in a S1-AP initial context setup request message), and transmit the UE context to the RAN node 302. The RAN node 302 may store the received message.

In step 330, the RAN node 302 may have the charging type (flat charging, unlimited charging plan, or the like) in which there is no problem even though the data packet is dropped in the congestion state, or apply an operation of dropping the corresponding packet only with respect to a UE in which packet drop is allowed according to the user subscription information.

According to an embodiment, when the foregoing operation is applied for per PDN connection (per APN) or per bearer (per EPS bearer), the information about charging type or the information indicating that packet drop is allowed may be separately transmitted per PDN connection or per bearer.

In addition, according to another embodiment, the UE context may be transmitted to the P-GW. According to an embodiment, an SPR may transmit the UE context to the P-GW. When the HSS or the SPR is not directly connected to the P-GW, the corresponding user subscription information may be transmitted to a PCRF (Policy and Charging Rules Function) by the HSS or the SPR, and transmitted as a part of PCC (Policy and Charging Control) rule or ADC rule which is transmitted by the PCRF in order to control the P-GW.

The UE context may include information that can be used as a determination factor in dropping the corresponding packet. The UE context may include the information that has been used to describe the embodiment of FIG. 3.

The P-GW that has received the UE context may store the UE context, enable information that can be determined when congestion is controlled by the RAN node 302 based on the UE context to be included in the packet, and transmit the packet. According to an embodiment, the information that can be determined when congestion is controlled may include an indicator indicating a case in which it is possible to drop the corresponding packet or an identifier indicating a transmission priority, and the indicator information may be included in a GTP-U header of the transmitted data packet, and transmitted. When the S-GW should transmit, to an eNB, the packet received from the P-GW, the S-GW may perform a process in which the information included in the GTP-U header is inserted again in the GTP-U header of the packet transmitted to the eNB and transmitted.

Figure 4:
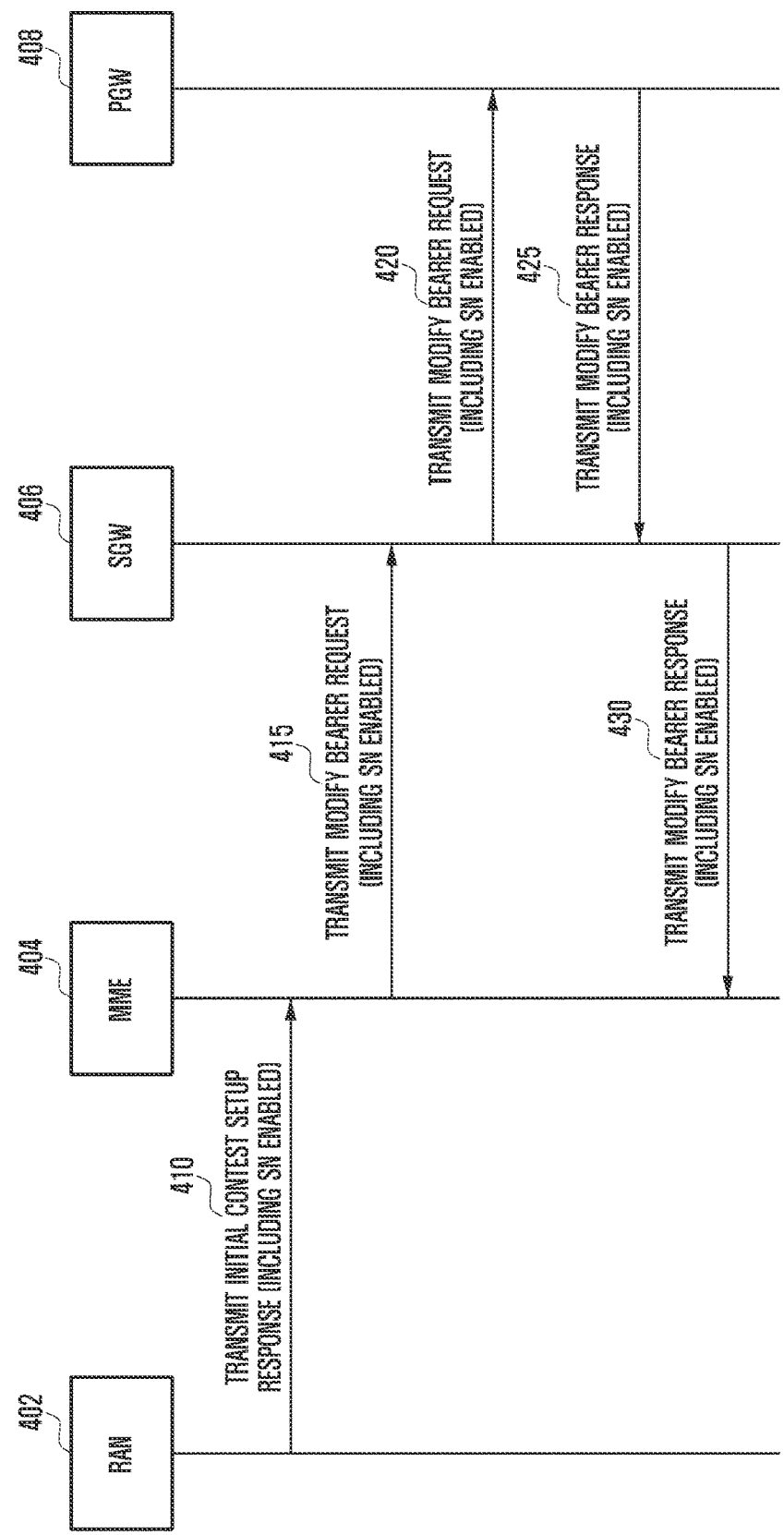
FIG. 4 illustrates a signal flow for performing congestion control according to an embodiment of the present invention.

When dropping the packet so as to control congestion, the eNB may inspect the packet to be dropped, and drop the packet when the indicator indicates that it is possible to drop the packet. In addition, the indicator may include a priority that can be determined when the packet is dropped. FIG. 4 illustrates a signal flow for performing congestion control according to an embodiment of the present invention.

Referring to FIG. 4, according to another embodiment, a method of determining whether a charge is imposed for the transmitted packet based on transmission success or transmission failure of the transmitted packet may be proposed.

GW nodes 406 and 408 that transmit a downlink packet up to an RAN node 402 in a core network may transmit the packet by attaching a sequence number to the packet when transmitting the packet. The RAN node 402 may notify again the GW nodes 406 and 408 of information indicating whether to transmit the corresponding packet. When the packets are transmitted up to the RAN node 402 via several nodes, intermediate hop nodes store SN mapping information of the received packet and the transmitted packet, and then change, when transmitting the information indicating whether to transmit the corresponding packet, the SN mapping information to SNs for the corresponding packets and transmit the SNs. When this information is transmitted up to a node that generates charging information, the charging information may be generated or corrected according to whether the corresponding packet is actually transmitted. According to an embodiment, this operation may be applied only to specific PDN connection or an EPS bearer.

In step 410, the RAN node 402 may transmit, to an MME 404, a message requesting to transmit the data packets by attaching SNs to the data packets transmitted to the RAN node 402 itself, as necessary (for example, a case of starting congestion control). In this instance, the RAN node 402 may request the transmission of the data packets from a specific bearer or regardless of the bearer.

In step 415, the MME 404 may transmit, to the S-GW 406, the message requesting to transmit the data packets by attaching SNs to the data packets, based on the reception of the foregoing request. According to an embodiment, the message requesting to transmit the data packets by attaching SNs to the data packets may include information requesting, from a modify bearer request message, that the corresponding SN should be necessarily written on the corresponding header in a case of the GTP-U packet to be transmitted in the future. This request may be performed per bearer as described above. In addition, the S-GW 406 may store an SN mapping table of a packet to be transmitted based on the request. Thus, the S-GW 406 may map the SN of the packet received from the P-GW 408 and the SN of the packet transmitted to the eNB 402.

In step 420, the S-GW 406 may transmit, to the P-GW 408, the message requesting to transmit the data packets by attaching SNs to the data packets. According to an embodiment, the message requesting to transmit the data packets by attaching SNs to the data packets may include information requesting, from a transmitted modify bearer request message, that the corresponding SN should be necessarily written on the corresponding header in a case of the GTP-U packet to be transmitted in the future. This request may be performed per bearer as described above.

In step 425, the P-GW 408 that has received this may store information indicating that the SN of the transmitted packet should be used (which bearer should be applied when the request is performed per bearer), and transmit the corresponding response to the S-GW 406. Thereafter, the respective nodes write the SN on the GTP-U header and transmit the corresponding packet, in a case of a data packet for a user (or a user's bearer) in which the SN is set to be used. In addition, in step 430, the S-GW 406 may transmit the transmitted response to the MME 404.

Figure 5:
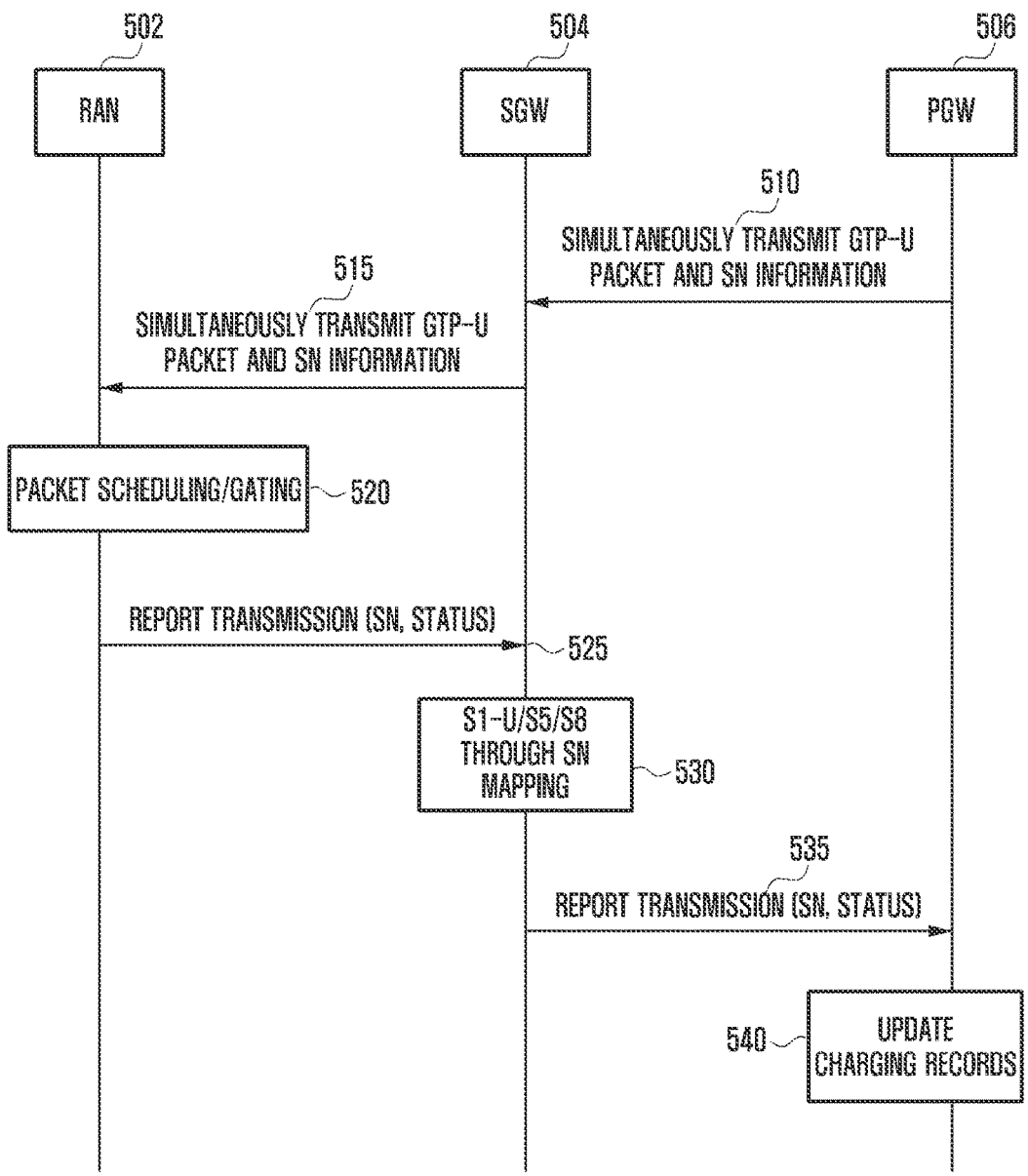
FIG. 5 illustrates data transmission and reception for performing congestion control according to an embodiment of the present invention.

FIG. 5 illustrates data transmission and reception for performing congestion control according to an embodiment of the present invention.

Referring to FIG. 5, transmission of the data packet and charging control may be performed in a method shown in FIG. 5. In addition, according to an embodiment, an SN capable of identifying a packet transmitted according to setting in FIG. 4 may be used in the packet. In addition, an S-GW 506 may store a mapping table of the transmitted SN.

In step 510, a P-GW 506 may record SN information with respect to a downlink packet by information set in advance or according to the embodiment. According to an embodiment, the SN information may be recorded in the transmitted packet using a SN field of the GTP-U header.

In step 515, when transmitting the received packet to an RAN node 502, the S-GW 504 may write the SN of the transmitted packet on a GTP-U header, and transmit the corresponding packet. Preferably, the S-GW 504 may write an SN field on a newly attached GTP-U header and transmit the corresponding packet. In addition, the S-GW 504 may store mapping information about the SN of the GTP-U packet which the S-GW 504 itself receives from the P-GW 506 and mapping information about the SN of the GTP-U packet that is used when the S-GW 504 transmits, to the RAN node 502, the SN of the GTP-U packet which the S-GW 504 itself receives from the P-GW 506.

In step 520, the RAN node 502 may transmit or drop the received packet according to its congestion state. According to an embodiment, the RAN node 502 may adjust the order of the transmission of the packet so as to control the congestion state.

In step 525, the RAN node 502 transmits the SN of the corresponding packet and information about a state of the corresponding packet to the S-GW 504. The state of the packet may include at least one of transmission success of the packet, transmission failure of the packet, whether the packet is dropped, and a time during which the packet stays in a buffer.

In step 530, the S-GW 504 may determine the SN of the GTP-U packet received from the P-GW 506 using the SN included in the information received in step 520 and mapping information stored in advance, based on the information received in step 520.

In step 535, the S-GW 504 may transmit the transmission state of the packet to the P-GW 506 based on the SN determined in step 530. According to an embodiment, the S-GW 504 transmits, to the P-GW 506, information including SNs of packets S5/S8 (interface between the S-GW 504 and the P-GW 506) and the state of the corresponding packet.

In step 540, when receiving the information, the P-GW 506 may generate charging information or utilize the received information when correcting the already generated charging information. Such packet transmission information transmitted from the RAN node 502 up to the P-GW 506 may be sent using a separate GTP-C message, or transmitted in the form of a next extension header of a GTP-U header of an uplink packet. In addition, the transmission information may be sent in a short period (for example, whenever receiving each packet) for the purpose of real-time charging, or the information collected at prescribed time intervals may be transmitted at the same time so as to reduce the signaling load.

Figure 6:
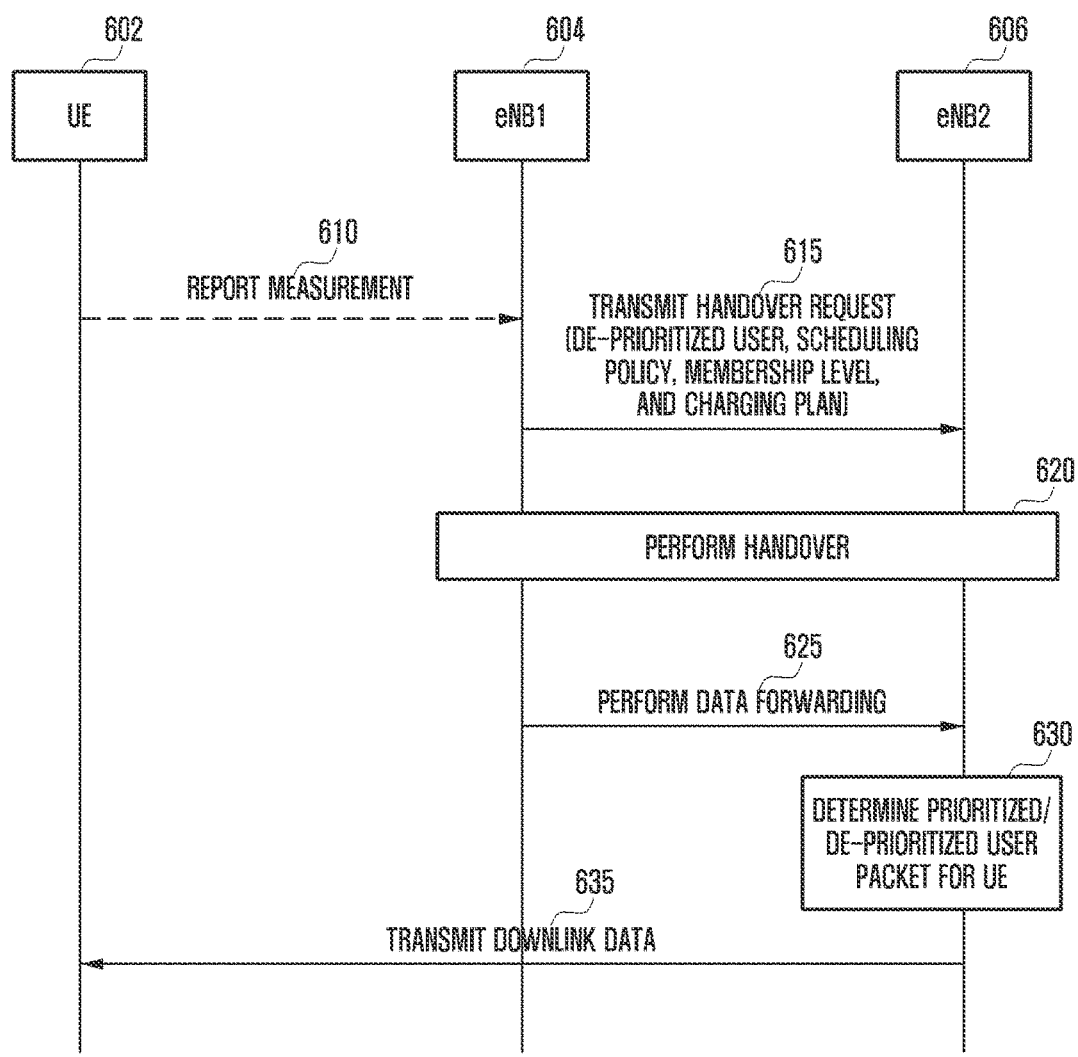
FIG. 6 illustrates a signal flow for congestion control at the time of handover of a UE according to an embodiment of the present invention.

FIG. 6 illustrates a signal flow for congestion control at the time of handover of a UE according to an embodiment of the present invention.

Referring to FIG. 6, when a UE 602 is connected to a first eNB 604 which applies congestion control due to the occurrence of congestion, receives services from the first eNB 604, and then is moved to a second eNB 606, the second eNB 606 is incapable of knowing states of data packets of the UE 602 transmitted and received in the first eNB 604, and therefore a problem in which the service qualities of other UEs are degraded due to a case in which the UE 602 is incapable of continuously receiving the service or due to the moved UE 602 may occur. In order to address the problem, when handover occurs, the first eNB 604 may notify the second eNB 606 of information indicating that the packets of the UE 602 have been subjected to congestion control, and the second eNB 606 may perform packet transmission control based on the notified information.

According to an embodiment, when the UE 602 performs handover from the congested first eNB 604 to the uncongested second eNB 606, the packet transmission control may be to transmit the corresponding packet prior to the traffic of other UEs having the same transmission priority in order to alleviate the starvation of the UE 602.

According to another embodiment, when the UE 602 performs handover from the congested first eNB 604 to the congested second eNB 606, the packet transmission control may be to prevent the service qualities of other UEs from being degraded by consecutively lowering the transmission priority of the UE 602 that has been already subjected to congestion control.

In step 610, the UE 602 may transmit, to the first eNB 604, measurement report information obtained by measuring a communication state. The measurement report information may include information through which whether to perform handover can be determined.

In step 615, the first eNB 604 determines whether to perform handover based on the transmitted measurement report information. According to an embodiment, the first eNB 604 may determine handover to the second eNB 606. When handover occurs, a handover request message transmitted to the second eNB 606 by the first eNB 604 may include at least one of information indicating whether the UE has been subjected to congestion control, information indicating which kind of scheduling policy is applied, information indicating whether the corresponding user is a de-prioritized user, subscription levels of the corresponding UEs (e.g., gold/silver/bronze membership users, etc.), and charging methods (e.g., unlimited charging plan, flat rate plan, an object to which number/volume-based charging is applied, etc.). When performing congestion control in the subsequent steps, the second eNB 606 may perform congestion control based on the received information included in the handover request message. In addition, according to an embodiment, the second eNB 606 that has received the information included in the handover request message stores and uses this information. In particular, information (e.g., whether to apply congestion control, congestion control application level, etc.) related to congestion control performed with respect to the UE 602 may be used when determining whether to raise or lower the transmission priority in a case of transmitting data traffic forwarded from the first eNB 604 during a handover process. Alternatively, the information related to congestion control performed with respect to the UE 602 may be used to apply congestion control when RAN congestion occurs in the second eNB. According to an embodiment, the de-prioritized user may include a user of a UE that is subjected to congestion control by a network.

In step 620, a handover process between the first eNB 604 and the second eNB 606 is performed, and in step 625, the first eNB 604 may transmit information required for the handover process to the second eNB 606.

In step 630, the second eNB 606 may perform congestion control by determining the transmission priority based on the information received from the first eNB 625.

In step 635, the second eNB 606 may transmit data to the UE 602. According to an embodiment, in step 630, congestion control may be performed based on the transmission priority determined in step 630 in a congestion state.

Figure 7:
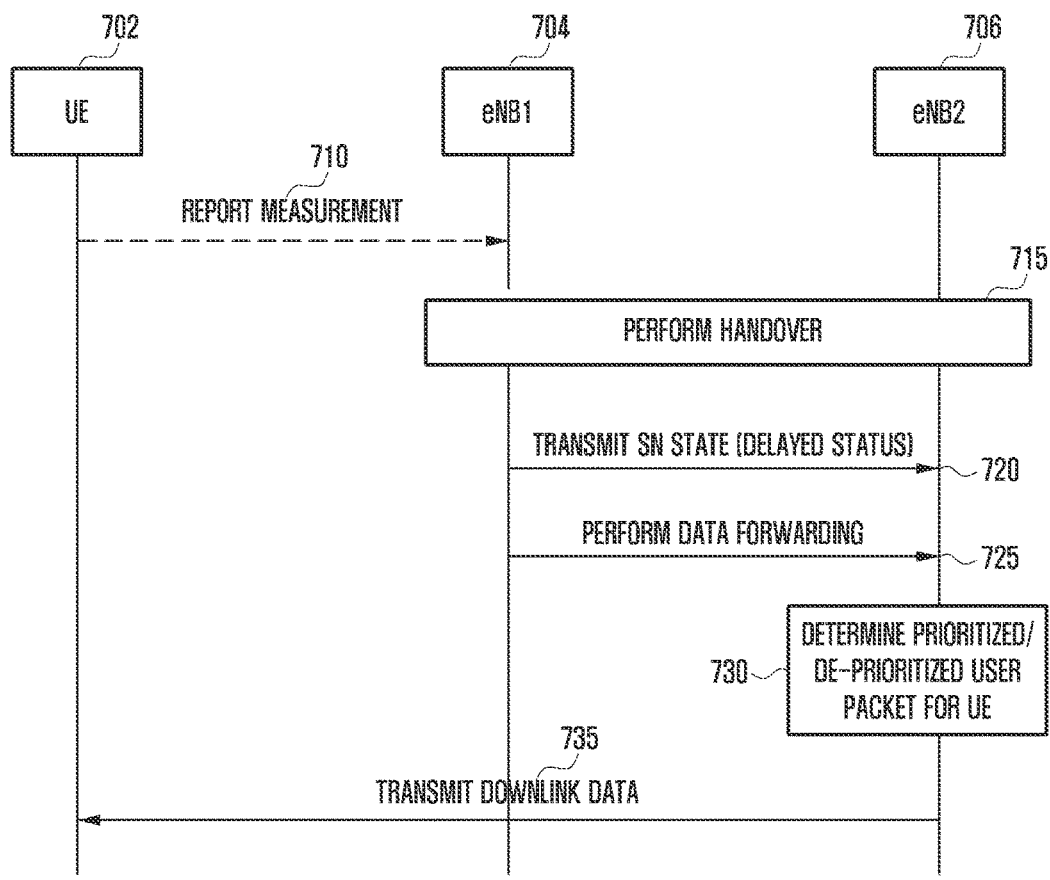
FIG. 7 illustrates a signal flow for congestion control at the time of handover of a UE according to another embodiment of the present invention.

FIG. 7 illustrates a signal flow for congestion control at the time of handover of a UE according to another embodiment of the present invention.

Referring to FIG. 7, in step 710, a UE 702 may transmit, to a first eNB 704, measurement report information obtained by measuring a communication state. The measurement report information may include information through which whether to perform handover can be determined.

In step 715, the first eNB 704 determines whether to perform handover based on the transmitted measurement report information. According to an embodiment, the first eNB 704 may determine handover to the second eNB 706. The first eNB 704 may perform handover to the second eNB 706.

In step 720, the first eNB 704 may transmit, to the second eNB 706, a message including information related to congestion control of the UE 702. According to an embodiment, the first eNB 704 may enable information about whether to apply differential transmission per data packet, information about a time during which the corresponding packet stays in a buffer of the corresponding eNB, and the like to be included in an SN status transfer transmitted to the second eNB 706, and transmit the SN status transfer. The first eNB 704 may enable congestion control information to be included in a control message, and transmit the control message to the second eNB 706.

In step 725, the first eNB 704 may transmit data including information required for handover to the second eNB 706.

In step 730, the second eNB 706 may store the information received from the first eNB 704 and use the stored information to perform congestion control based on the stored information. According to an embodiment, the stored information may be used when determining whether to raise or lower the transmission priority in a case of transmitting data traffic forwarded from the first eNB 704 during a handover process. According to another embodiment, the second eNB 706 may apply a method such as preferentially transmitting a packet in which a time during which the packet stays in the buffer is 100 ms or more.

Figure 8:
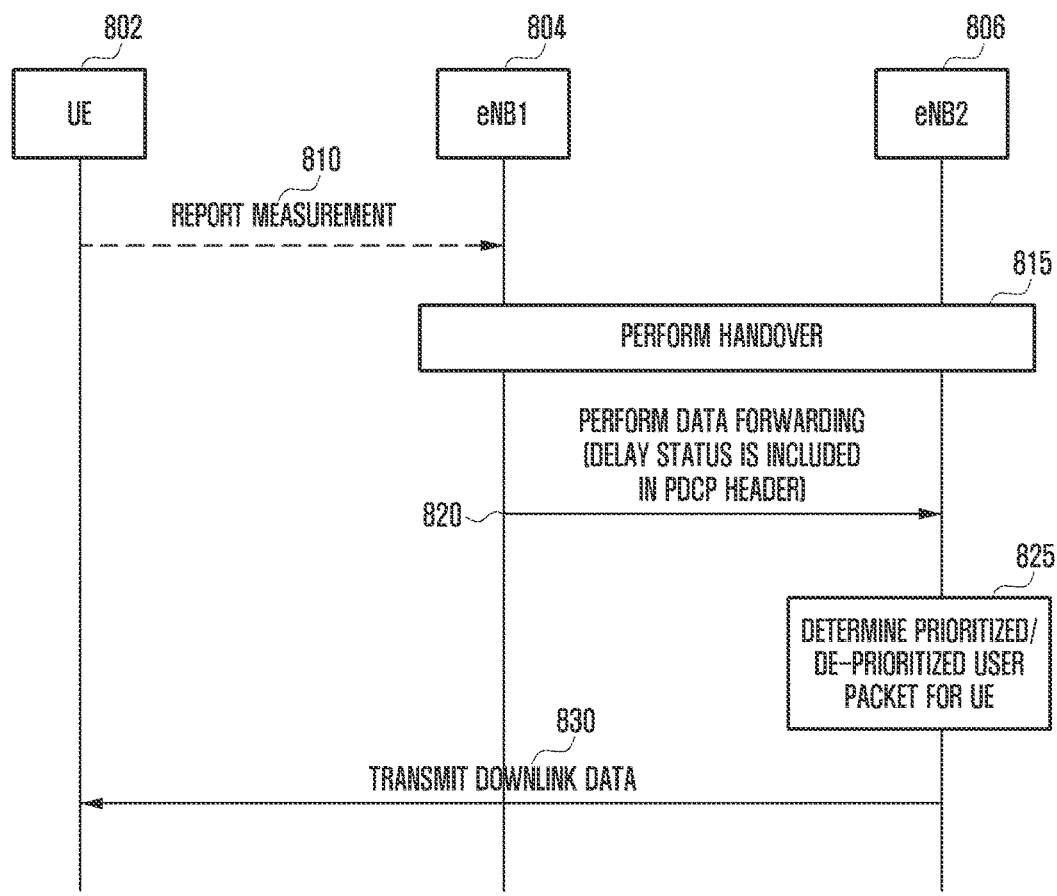
FIG. 8 illustrates a signal flow for congestion control at the time of handover according to still another embodiment of the present invention.

FIG. 8 illustrates a signal flow for congestion control at the time of handover according to still another embodiment of the present invention.

In FIG. 8, procedures of steps 810 and 815 may respectively correspond to procedures of steps 710 and 715 of FIG. 7.

Referring to FIG. 8, in step 820, when handover occurs, a first eNB 804 may transmit, to a second eNB 806, information about whether to apply differential transmission of each packet or information about a time during which the corresponding packet stays in a buffer of the corresponding eNB, using new fields of PDCP headers of forwarded data packets.

In step 825, the second eNB 806 that has received the foregoing information may store the foregoing information. Thereafter, the stored information may be used when determining whether to raise or lower the transmission priority in a case of transmitting, to a UE 802, data traffic forwarded from the first eNB 804 during a handover process. For example, a method such as preferentially transmitting a packet in which a time during which the packet stays in the buffer is 100 ms or more may be applied.

In FIGS. 6 to 8, the congestion control-related information transmitted between the respective eNBs may be associated with each other, and it should be noted that the related information of the different embodiments may be borrowed and used in each embodiment.

Figure 9:
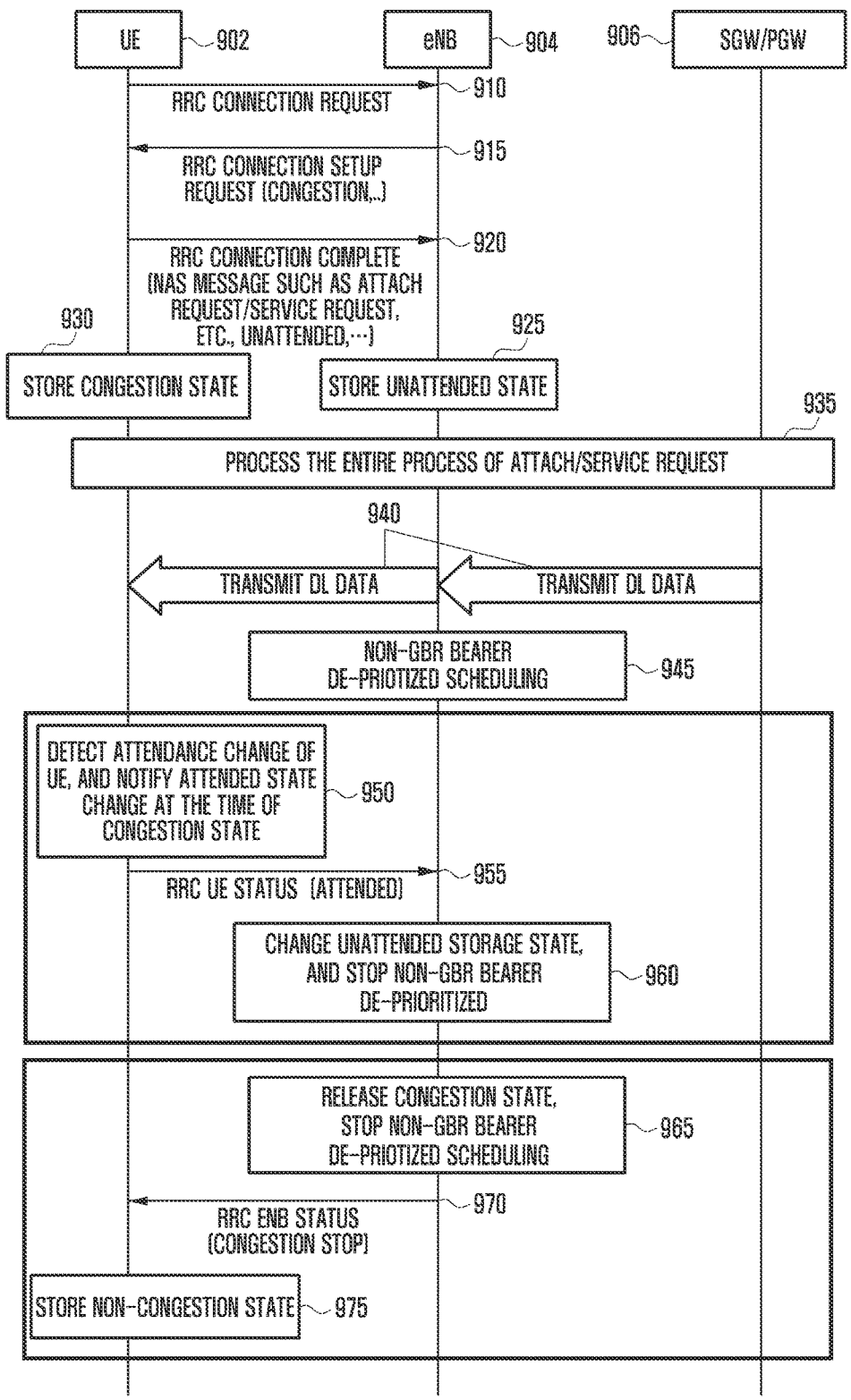
FIG. 9 illustrates a signal flow for congestion control based on a character of a packet according to an embodiment of the present invention.

FIG. 9 illustrates a signal flow for congestion control based on a character of a packet according to an embodiment of the present invention.

Referring to FIG. 9, most of the traffic currently used by a UE 902 is generated without direct interaction with a user. For example, traffic may be generated due to data transmitted and received in the background by applications currently executed in the UE 902 even though a user prevents the UE 902 from being directly used by turning on a screen of the UE 902. Such background traffic is transmitted and received regardless of the user's intention, and therefore it is unnecessary to preferentially transmit the background traffic in a congestion state. According to an embodiment, data having direct interaction with a user may be referred to as attended data, and data not having direct interaction with a user may be referred to as unattended data.

Thus, in the case of the data not having direct interaction with the user, the user of the UE 902 cannot directly recognize inconvenience even though the data is not preferentially transmitted, and the data may be transmitted again by the subsequent re-transmission process, and therefore it is possible to lower the transmission priority in the congestion state.

In step 910, the UE 902 may transmit an RRC connection request message to an eNB 904. In step 915, the eNB 904 may transmit an RRC connection setup request to the UE 902 based on the message transmitted in step 910. The RRC connection setup request message may include a message notifying that the eNB 904 is in a congestion state.

In step 920, the UE 902 may transmit an RRC connection complete message to the eNB 904. The RRC connection complete message may include at least one of an attach request/service request message and an NAS message. In addition, in step 915, the UE 902 that has received the message notifying the congestion from the eNB 904 may enable information including whether data whose transmission is requested is attended/unattended to be included in the RRC connection complete message, and transmit the RRC connection complete message.

In step 925, the eNB 904 may store information indicating that the data whose transmission is requested is unattended. When the data whose transmission is requested is attended, the corresponding operation may be performed in a similar manner to that of an existing operation.

In step 930, the UE 902 may store information indicating that the eNB 904 is in the congestion state. In the transmission according to this, when detecting whether to display data or when the data transmitted by the UE is changed to be attended in the subsequent step, the corresponding message may be transmitted to the eNB 904.

In step 935, the entire process of attach/service request among the UE 902, the eNB 904, and an S-GW/P-GW 906 may be completed.

In step 940, downlink data may be transmitted to the S-GW/P-GW 906, the eNB 904, and the UE 902.

In step 945, the eNB 904 may lower the transmission priority of the traffic belonging to a non-GBR bearer out of the traffic for the corresponding UE.

Steps 950 and 960 correspond to a case in which there is a change in the data transmitted by the UE 902, and steps 965 to 975 correspond to a case in which the congestion state of the eNB 904 is released.

In step 950, the UE 902 may detect the attendance change of the transmitted data. According to an embodiment, the attendance change may include at least one of a case in which data to be transmitted and received is generated by a user's input and a case in which a display unit of the UE 902 is turned on.

In step 955, the UE 902 may transmit, to the eNB 904, a message indicating that the state of the data transmitted by the UE is changed. This message may be transmitted only when the UE 902 is notified of the congestion state of the eNB 904. According to an embodiment, the UE 902 may transmit, to the eNB 904, information indicating that the state of the data transmitted through an RRC UE status message becomes attended.

In step 960, the eNB 904 may change an unattended state to an attended state based on the message received in step 955. In addition, according to an embodiment, the eNB 904 that has received the message no longer lowers the transmission priority of non-GBR traffic.

In step 965, the congestion state of the eNB may be released. In this case, the eNB 904 may stop scheduling for lowering the priority of non-GBR bearer transmission.

In step 970, the eNB 904 may transmit, to the UE 902, a message indicating that the congestion state of the eNB 904 is released. According to an embodiment, the message may be included in an RRC eNB status message and transmitted.

In step 975, the UE 902 may store information indicating that the congestion state of the eNB 904 is released.

According to an embodiment, the UE 902 may notify the change in the attended (intended by a user)/unattended (unintended by a user) state only in an RAN congestion state. Whether the UE is attended/unattended may be determined when a program other than a program set by an operator is executed or when data is generated even though the screen of the UE is turned off. The UE 902 recognizes that congestion occurs in an RAN from the eNB 904 through the RRC connection setup request message, enables the attended/unattended state of the UE 902 to be included in the RRC connection complete message, and transmits the RRC connection complete message.

In this process, the UE 902 stores information about whether the eNB 904 is congested, and the eNB 904 stores information about whether the corresponding user is in the unattended state. When downlink data reaches the P-GW in the case of notifying that the UE 902 is unattended, the eNB 904 may lower the transmission priority of the traffic belonging to the non-GBR bearer out of the traffic for the corresponding UE. When the eNB 904 is still congested even though the UE is changed to the attended state, the UE 902 transmits the state change through the RRC UE status message. The eNB that has received this no longer lowers the transmission priority of the non-GBR traffic. Meanwhile, when the congestion of the eNB 904 is released, the transmission priority of the non-GBR traffic may not be lowered despite notifying that the UE 902 is in the unattended state, and information indicating that the eNB 904 is no longer congested may be notified to the UE 902 through the RRC eNB status message. The UE 902 may store the state of the eNB 904.

According to the above-described embodiment, there is an advantage in that the UE 902 is capable of dynamically transmitting traffic in a differential manner in a state of being active, but there is a disadvantage in that signaling may frequently occur or overflow of the data buffer of the eNB may occur.

Figure 10:
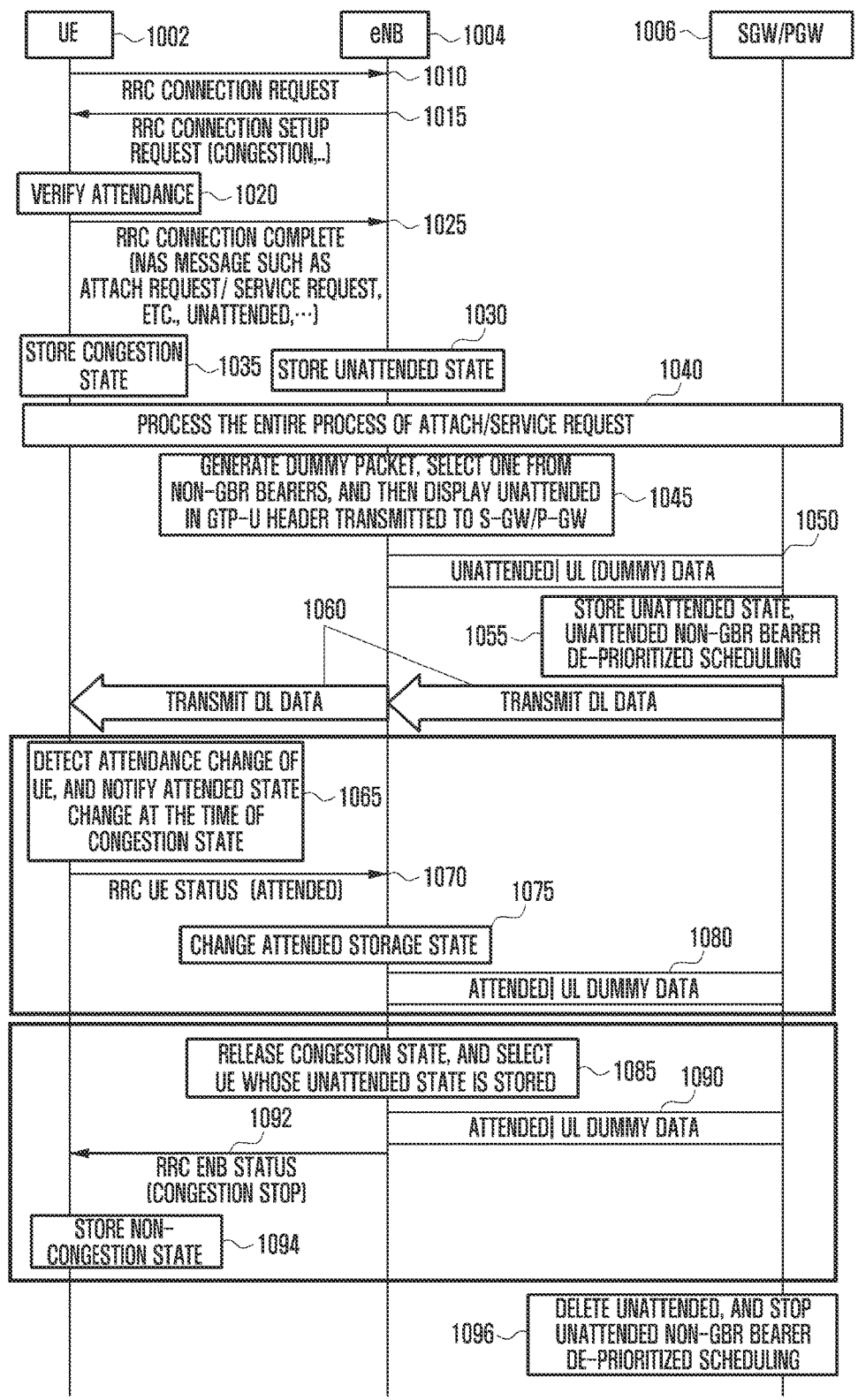
FIG. 10 illustrates a signal flow for congestion control based on a character of a packet according to another embodiment of the present invention.

FIG. 10 illustrates a signal flow for congestion control based on a character of a packet according to another embodiment of the present invention.

Referring to FIG. 10, according to another embodiment of the present invention, a method of notifying information about whether an UE 1002 is attended using a packet (preferably, GTP-U header) transmitted up to a P-GW 1006 in a congestion state may be proposed. For this, when there is uplink data, the header of the uplink data is used, and otherwise, a dummy packet is made and transmitted. In this case, the GTP-U header may include information about whether the corresponding UE is attended together with information notifying that the corresponding packet is a dummy.

Steps 1010 and 1015 may be performed in a similar manner to that of steps 910 and 915 of FIG. 9 so as to correspond to steps 910 and 915 of FIG. 9.

In step 1015, the UE 1002 may recognize that congestion occurs in an RAN from an eNB 1004 through an RRC connection setup request message, and in step 1020, the UE 1002 may verify attendance.

Step 1025 may be performed in a similar manner to that of step 920 of FIG. 9 so as to correspond to step 920 of FIG. 9. The UE 1002 may enable its attended/unattended state to be included in an RRC connection complete message and transmit the RRC connection complete message.

In step 1035, the eNB 1004 may store the attendance state of the UE. According to an embodiment, the eNB 1004 may store information indicating that the UE transmits and receives data while being in the unattended state.

In step 1035, the UE 1002 may store information indicating that the eNB 1004 is in the congestion state.

In step 1040, the UE 1002, the eNB 1004, and an S-GW/P-GW 1006 may perform the entire process of attach/service request.

In step 1045, when there is a non-GBR uplink packet transmitted from the UE 1002, the eNB 1004 may use the non-GBR uplink packet, and otherwise, the eNB 1004 may display whether the UE 1002 is attended/unattended by generating a dummy packet. According to an embodiment, preferably, the eNB 1004 may display, in the GTP-U header, whether the UE 1002 is attended/unattended.

In step 1050, information displaying whether the UE 1002 is attended/unattended may be transmitted up to the S-GW/P-GW 1006 in the same manner.

In step 1055, when the S-GW/P-GW 1006 is in the unattended state, the priority of traffic transmitted to the corresponding UE 1002 may be lowered. According to an embodiment, the S-GW/P-GW 1006 may lower the transmission priority of the non-GBR traffic with respect to the UE 1002 when the corresponding UE 1002 is in the unattended state.

Steps 1065 to 1080 correspond to an example of transmitting, when a change in the attendance of the UE 1002 is detected, the detected change to the eNB 1004 and the S-GW/P-GW 1006.

When the eNB 1004 is still congested even though the UE 1002 is changed to the attended state in step 1065, the UE 1002 may transmit the state change to the eNB 1004 through an RRC UE status message in step 1070. In step 1080, the eNB 1004 that has received this may notify the S-GW/P-GW 1006 that the UE 1002 is changed to be attended using the GTP-U header in the same manner as that in the foregoing description. As the message transmitting each piece of information, other messages may be used according to embodiments.

Steps 1085 to 1095 correspond to a method in which the eNB 1004 transmits information to each component when the congestion of the eNB 1004 is released.

In step 1085, the eNB 1004 may determine whether the congestion state is released. In addition, according to an embodiment, the eNB 1004 may transmit, only to UEs which become unattended, information indicating that the congestion state of the eNB 1004 is released. However, in a different embodiment, the eNB 1004 may transmit, to all UEs 1002, the information indicating that the congestion state of the eNB 1004 is released.

In step 1090, the eNB 1004 may transmit, to the S-GW/P-GW 1006, the information indicating that the congestion state of the eNB 1002 is released. The eNB 1002 may enable this information to be included in the header of dummy data, and transmit the dummy data.

In step 1092, the eNB 1004 may transmit, to the UE 1002, the information indicating that the congestion state of the eNB 1004 is released. According to an embodiment, the eNB 1004 may notify the UE 1002 of this information through an RRC eNB status message. In addition, according to an embodiment, the UE 1002 notifies that a user is in an attended state using the GTP-U header regardless of the unattended state of the UE. The GW nodes 1006 that have received this may not lower the transmission priority of the non-GBR traffic.

According to the above-described embodiment, there is an advantage in that differential transmission may be dynamically applied to the UE 1002 which is simple and active, but there is a disadvantage in that signaling may frequently occur.

Figure 11:
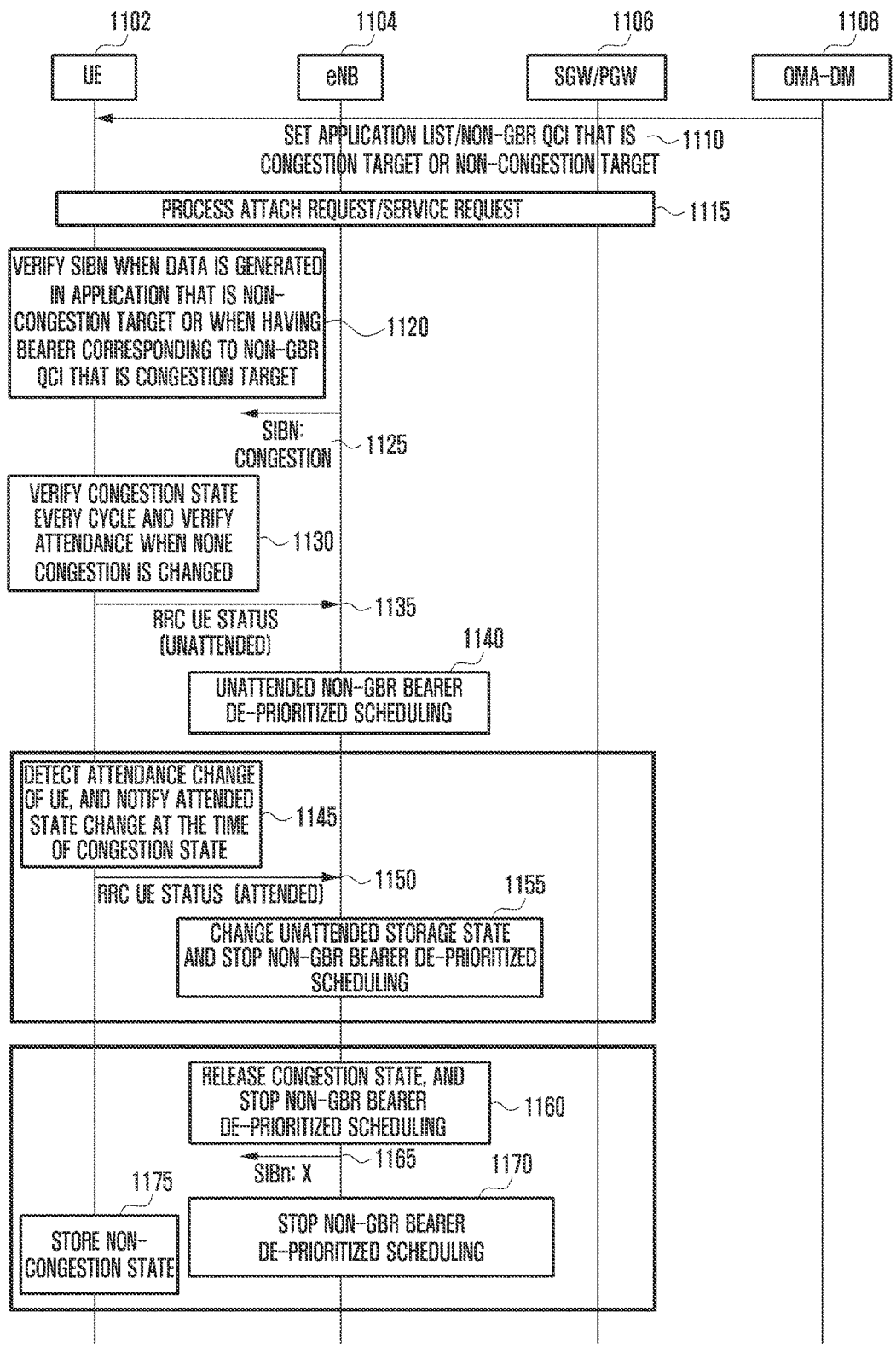
FIG. 11 illustrates a signal flow for congestion control based on a character of a packet according to still another embodiment of the present invention.

FIG. 11 illustrates a signal flow for congestion control based on a character of a packet according to still another embodiment of the present invention.

Referring to FIG. 11, according to an embodiment, a method of broadcasting a congestion state of an eNB 1104 and determining whether a UE 1102 notifies a change in the attended state based on received broadcast information is proposed.

In step 1110, the UE 1102 may set a type of an application or a QCI of an EPS bearer to which the attended/unattended states of the UE 1102 should be reported in a congestion state, using a method of using an OMA-DM server 1108.

In step 1115, attach request/service request may be processed among the UE 1102, the eNB 1104, and the S-GW/P-GW 1106.

When traffic is generated from the application to which the attended/unattended states should be reported or the UE 1102 has the QCI to which the attended/unattended states should be reported in step 1120, the UE 1102 may periodically receive an SIBn for broadcasting congestion information in step 1125. The UE 1002 may transmit an attendance state of the UE based on the received SIBn. When the SIBn notifies that the eNB 1104 is currently congested, the UE 1102 may determine whether the UE 1102 is attended or unattended in step 1130, and when the attendance state of the UE 1102 is changed, the UE 1102 may notify the eNB 1104 of the changed attendance state in step 1150. According to an embodiment, the UE 1102 may notify the eNB 1104 of the change in the attendance state using an RRC UE status message.

The subsequent operation may be the same as that of FIG. 9, and when the GW node performs traffic control as described in FIG. 10, steps 1115 to 1140 of FIG. 11 may be replaced by steps 1010 to 1050 of FIG. 10. However, according to an embodiment, when releasing the congestion state of the eNB 1104, whether the congestion state is released may be notified to the UE 1102 through the SIBn in step 1165.

Meanwhile, congestion information of the broadcasted RAN may be used even to reduce an amount of data actively generated in the UE 1102. For this, the eNB 1104 may transmit either information indicating a degree of the current congestion state or information indicating an amount of data that should be reduced compared to the current amount of data. For example, when an amount of data that is generated is requested to be reduced by 20% compared to the current amount of data through the congestion information broadcasted by the SIBn, the UEs 1102 that have received the request may perform an operation of reducing the amount of data that is generated by the UEs 1002 or data to be generated by requests of the UEs 1002 by 20%.

The method according to the embodiment may reduce the effect of signaling using an SIB, but a part of the broadcasting resources may be consumed.

Figure 12:
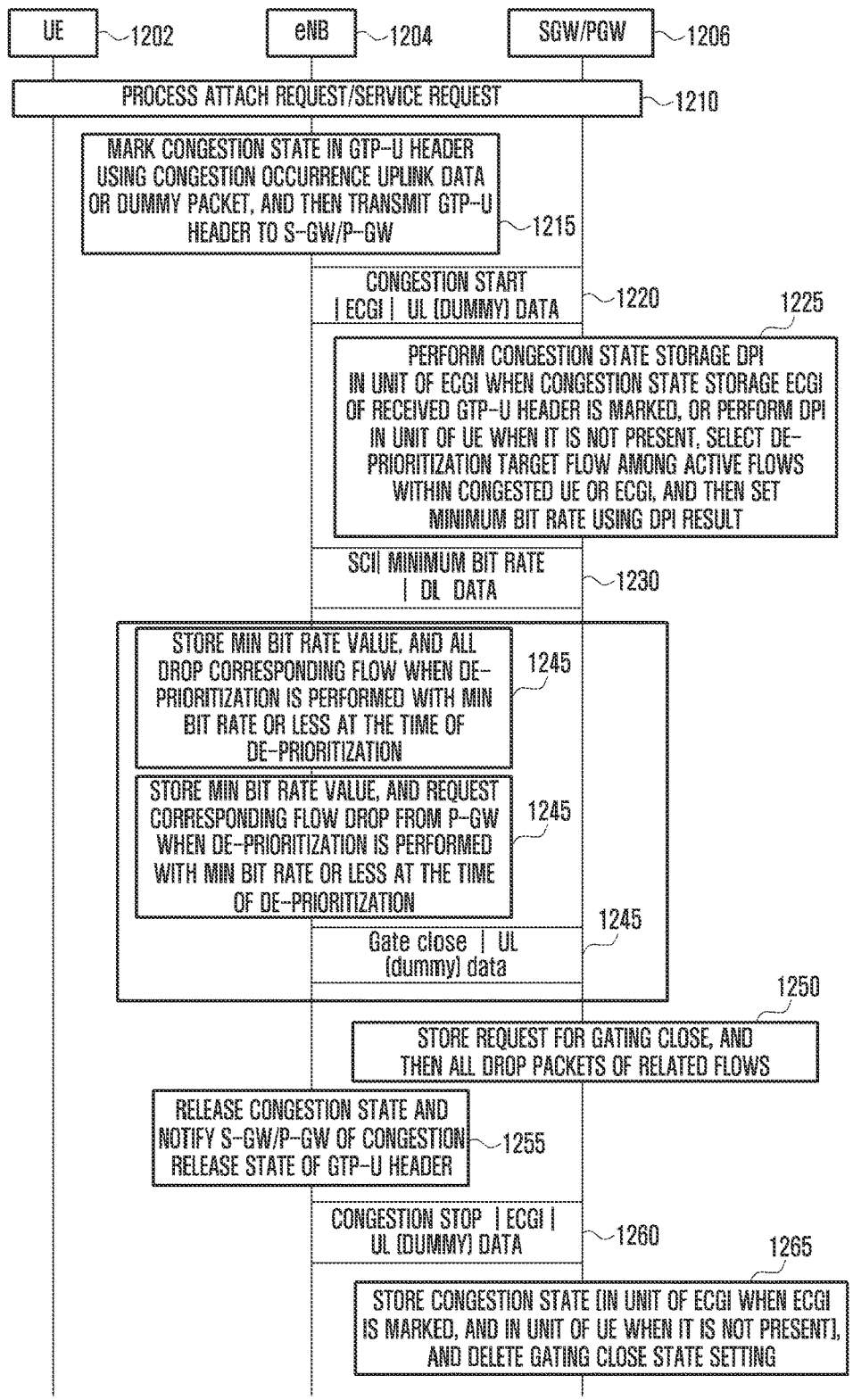
FIG. 12 illustrates a signal flow for congestion control based on a character of a packet according to yet another embodiment of the present invention.

FIG. 12 illustrates a signal flow for congestion control based on a character of a packet according to yet another embodiment of the present invention.

Referring to FIG. 12, a method that can be used to perform congestion control in a congestion state without the intervention of a UE 1202 is proposed.

According to an embodiment, a P-GW 1206 may drop a DL packet or adjust a scheduling speed according to congestion state information and gating state information.

In step 1210, among a UE 1202, an eNB 1204, and the S-GW/P-GW 1206, attach request/service request may be processed.

In step 1215, when congestion occurs, the eNB 1204 may transmit a message notifying the corresponding congestion state to the S-GW/P-GW 1206. According to an embodiment, in step 1220, the eNB 1204 may transmit the congestion state to the S-GW/P-GW 1206 using a GTP-U header. This may be performed in a similar manner to a method in which the eNB transmits the congestion state to the GW node in the above-described embodiment. In addition, the S-GW may relay the related header to the P-GW. According to an embodiment, the eNB may transmit information about whether the eNB is congested to the S-GW/P-GW 1206 using a header of dummy data.

In step 1225, when congestion control is performed in units of cells, the P-GW 1206 performs DPI with respect to all active non-GBR bearers which receive services in a congested cell (ECGI), thereby selecting target flows. When applying the corresponding operation only to the specific UE 1202, the P-GW 1206 performs DPI with respect to all active non-GBR bearers of the corresponding UE 1202, thereby selecting target flows. In step 1230, the P-GW 1206 selects a minimum bit rate of the target flow based on the DPI result, and transmits the selected minimum bit rate to the eNB 1204 when transmitting DL data to the GTP-U header.

In steps 1235 and 1240, the eNB 1204 may perform scheduling so as to satisfy the minimum bit rate on the basis of the minimum bit rate included in the GTP-U header.

According to an embodiment, in step 1245, when it cannot satisfy the requested minimum hit rate due to the severe congestion of the eNB 1204, the eNB 1204 may request gating close for the corresponding flow from the P-GW 1206. In step 1250, the S-GW/P-GW 1206 that has received the request of step 1245 may store the request for gating close, and then all drop packets of the related flows.

In addition, in step 1235, when it cannot satisfy the minimum bit rate, the eNB 1204 may all drop the corresponding packets.

In step 1255, when releasing congestion of the eNB 1204, the eNB 1204 may transmit a message indicating that the congestion has been released to the S-GW/P-GW 1206. According to an embodiment, a congestion stop state may be transmitted to the S-GW/P-GW 1206 using the GTP-U header through the transmitted message. When such control (S-GW relays the related header to P-GW) is performed in units of cells, the P-GW 1206 that has received this may delete congestion state information and state information per flow being currently subjected to gating close, and when such control is performed in units of UEs 1202, the P-GW 1206 may delete congestion state information and gating close state information of flows of the corresponding UE in step 1265.

Figure 13:
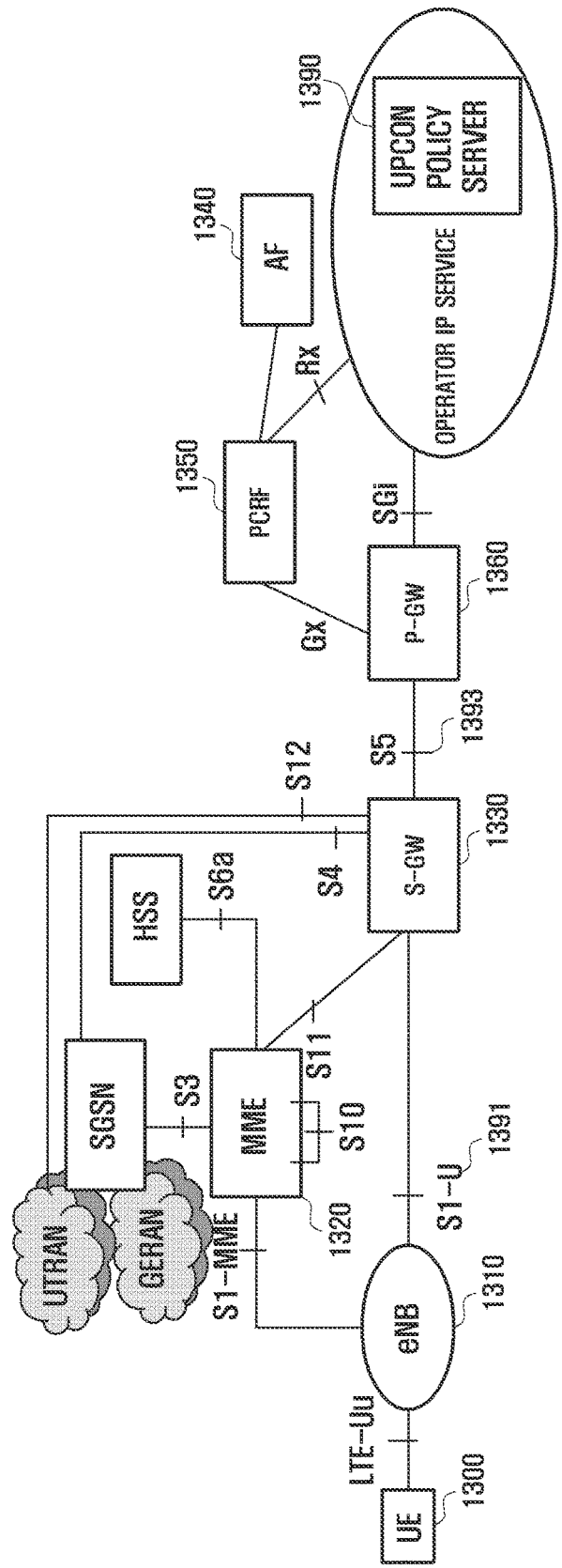
FIG. 13 illustrates a structure when congestion control is performed based on a character of an application in a communication system according to an embodiment of the present invention.

FIG. 13 illustrates a network configuration when congestion control is performed based on a character of an application in a communication system according to an embodiment of the present invention.

Referring to FIG. 13, an operator IP service network may include a User Plane Congestion (UPCON) policy server 1390. The UPCON policy server 1390 may be a server that determines a policy for user plane-related congestion control, and may be located in the operator IP service network or located in at least one of a PCRF 1350 and an HSS. In addition, according to an embodiment, the UPCON policy server 1390 may be access network discovery and selection function (ANDSF). According to an embodiment, the UPCON policy server 1390 may transmit information for congestion control to other communication entities.

Figure 14:
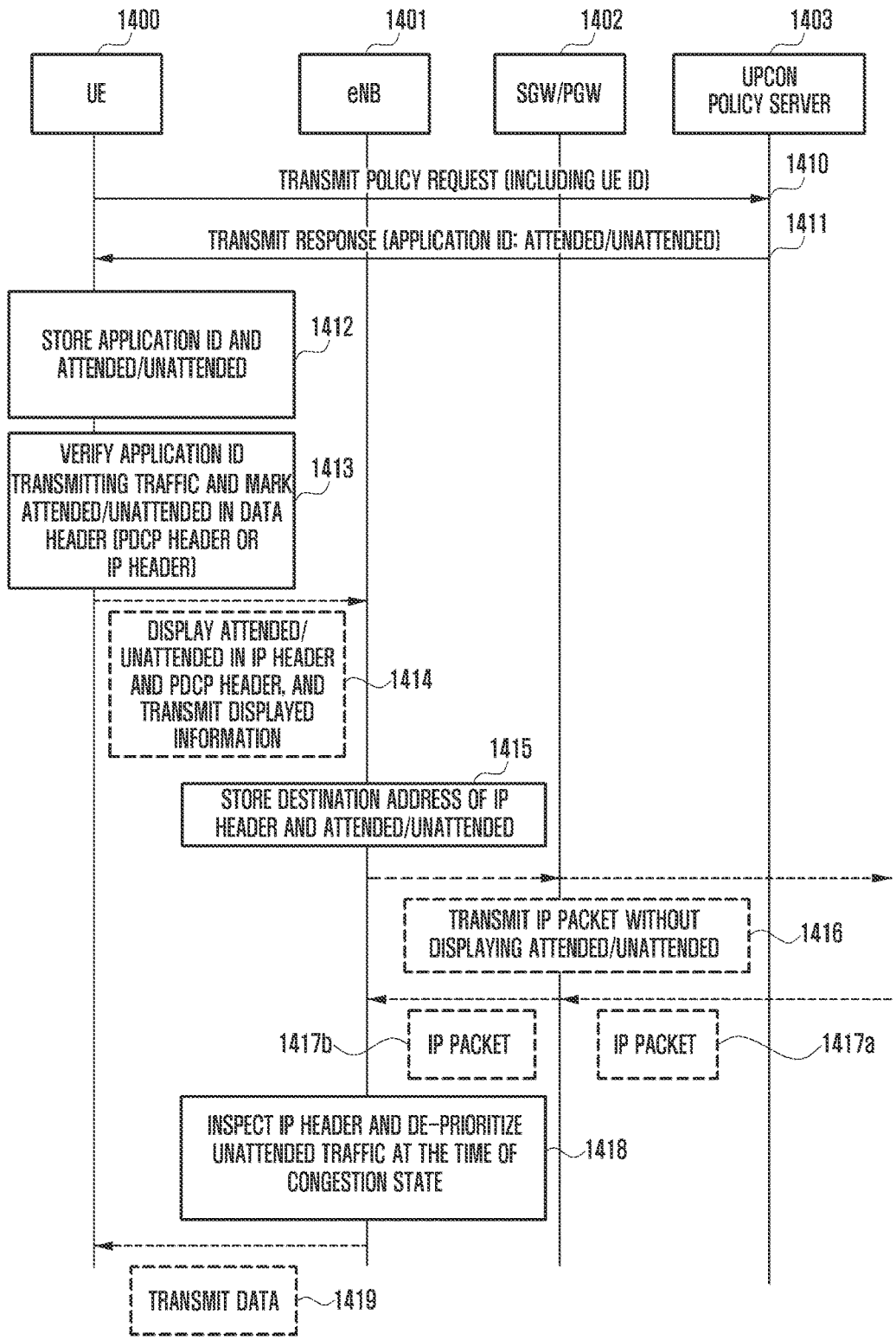
FIG. 14 illustrates a signal flow and data processing for congestion control based on a character of an application according to still another embodiment of the present invention.

FIG. 14 illustrates a signal flow and data processing for congestion control based on a character of an application according to still another embodiment of the present invention.

Referring to FIG. 14, a signal flow when the UPCON policy server 1390 exists within the operator IP service network in the same manner as that in FIG. 13 and congestion control is performed in a mobile communication network based on a character of the corresponding application is illustrated.

According to an embodiment, the UPCON policy server 1403 is a server that stores setting concerning attended/unattended per application set by the operator, and as in the description of the structure of FIG. 13, and may be an entity that is located within the operator IP service network so as to be connected to the corresponding UE via a data network. However, the location of the UPCON policy server 1403 is not limited to the operator IP service network.

According to an embodiment, a UE 1400 may acquire an address of the UPCON policy server 1403 by sending a DNS query using information of the UPCON policy server 1403 stored in the UE 1400 or requesting information from a DHCP (Dynamic Host Configuration Protocol) server. The information of the UPCON policy server 1403 may include an FQDN (fully qualified domain name).

In step 1410, the UE 1400 transmits, to the UPCON policy server 1403, a request message for requesting a policy using the address of the UPCON policy server 1403. The request message includes an ID for identifying the UE 1410. In addition, according to an embodiment, the policy may include a factor for determining a congestion control-related policy. In addition, according to an embodiment, the request message may additionally include an ID for identifying one or more applications executed in the UE 1410.

In step 1411, the UPCON policy server 1403 that has received the request message of step 1410 verifies the ID of the UE 1400. In addition, the UPCON policy server 1403 may store attended/unattended setting per ID of the application set by the operator, and transmit a response message to the UE 1400 in response to the request of step 1410. In addition, according to an embodiment, the UPCON policy server 1403 may determine whether the UE 1400 is a roaming UE based on the ID of the UE 1400, and apply an attended/unattended setting value per ID of another application depending on the operator that operates roaming, thereby configuring the corresponding response. In addition, the UPCON policy server 1403 may apply the attended/unattended setting based on the received one or more application IDs, thereby configuring the corresponding response. The setting may be also configured differently depending on a network operator that provides services to the UE.

According to an embodiment, the UPCON policy server 1403 may store attended/unattended setting per application based on at least one of a user's usage pattern and the application's character, and when there is the request of the UE 1400 such as in step 1410, the UPCON policy server 1403 may transmit an attended/unattended setting list corresponding to the application ID to the UE 1400.

In step 1412, the UE 1400 that has received the response message of the UPCON policy server 1403 stores information included in the received message. The information included in the received message may include an application ID list and information about whether each application is attended or unattended.

According to an embodiment, after step 1412, when the application executed in the UE 1400 generates data, the UE

1400 may determine whether the application that causes the generation of the data is set to be attended or unattended based on the information stored in step 1412.

In step 1413, the UE 1400 may enable the information about whether the application causing the generation of the data is attended or unattended to be included in data to be transmitted according to the determination result, and transmit the data to be transmitted to the eNB 1401. According to an embodiment, the information about whether the application is attended or unattended may be included in at least one of the headers of the data to be transmitted, and preferably, an attended/unattended display extension field vale may be set in at least one of an extension field of an IP header and an extension field of a PDCP header, and transmitted to the eNB 1401.

In step 1414, the UE 1400 may transmit the data that has been processed in step 1413 to the eNB 1401.

In step 1414, the UE 1400 may transmit the data that has been processed in step 1413 to the eNB 1401.

In step 1415, the eNB 1401 that has received the data transmitted in step 1414 may verify the value set by the UE 1400 in step 1413. In addition, according to an embodiment, the eNB 1401 may perform a process of storing at least one of an address of the received data, port information, and attended/unattended setting, and then deleting attended/unattended-related information.

According to an embodiment, the address of the received data may be included in the IP header, and may include at least one of a source address of the received data and a destination address of the received data.

In step 1416, the eNB 1401 may transmit the data having been processed in step 1415 to an S-GW/P-GW 1402, and the S-GW/P-GW 1402 may transmit the transmitted data to the outside of the operator network.

When receiving the data transmitted to the UE 1400 in step 1417a, the S-GW/P-GW 1402 may transmit the received data to the eNB 1401 in step 1417b.

In step 1418, the eNB 1401 that has received the data inspects an IP header of the data received in step 1417b when the eNB 1401 is currently in a congestion state. According to an embodiment, the congestion state may be determined based on the information included in the received data or an amount of transmitted and received data of the eNB 1401. According to an embodiment, when inspecting the IP header of the received data, the eNB 1401 compares a destination address stored in step 1415 and a source address of the data received in step 1417b, and compares a source address stored in step 1415 and a destination address of the data received in step 1417b. In addition, in the same manner even in the case of a port number, the eNB 1401 compares a destination port stored in step 1415 and a source port received in step 1417b, and compares a source port stored in step 1415 and a destination port received in step 1417b. In the foregoing comparison process, one or more values may be compared according to embodiments, and when the values coincide with each other based on the comparison result, whether the corresponding data traffic is stored to be attended or unattended is determined in step 1415. The foregoing determination process may include a process of comparing an application ID that causes generation of the data traffic. When the application is set to be attended based on the determination result, the eNB 1401 transmits the corresponding data traffic to the UE 1400 without adjustment of the priority of the corresponding data traffic. When the application is set to be unattended based on the determination result, the eNB 1401 may perform scheduling by lowering the priority of the corresponding data traffic. The process of lowering the priority of the corresponding data traffic may include a process of delaying the transmission of a packet included in the data traffic or a process of dropping the packet included in the data traffic.

In step 1419, the eNB 1401 may transmit data including the data received in step 1417b to the UE 1400 based on the result of step 1418.

In addition, according to another embodiment, in step 1416, the eNB 1401 may transmit a packet including an indicator indicating attended/unattended states to the outside of the operator network. According to an embodiment, the indicator may be included in the IP header, and an application server that has received the foregoing packet may determine a data transmission method based on the attended/unattended states.

Meanwhile, the embodiment of the present invention may be used to mitigate or prevent the occurrence of improper charge imposition on the UE in the operator network.

More specifically, inaccurate charge imposition for data of the UE may occur even a case in which the UE is unable to communicate with the system temporarily. By way of example, when a UE is temporarily moved to 2G/3G networks to use CS services due to generation of a voice call in an area in which VoLTE or CSFB is not supported in a case in which the UE is located in the shadow area, the UE is unable to receive the data packet from the network.

In this case, a service disabled state in which the UE is unable to receive data packet from the network is detected and it may take time to transmit the service disabled state to the core network. In this manner, when the packets are continuously introduced to the eNB or the core network node while the service disabled state is transmitted to the core network, a case in which the packet is lost in the eNB or the core network node and thereby cannot be transmitted to the UE even though charging information is generated may occur.

Figure 15:
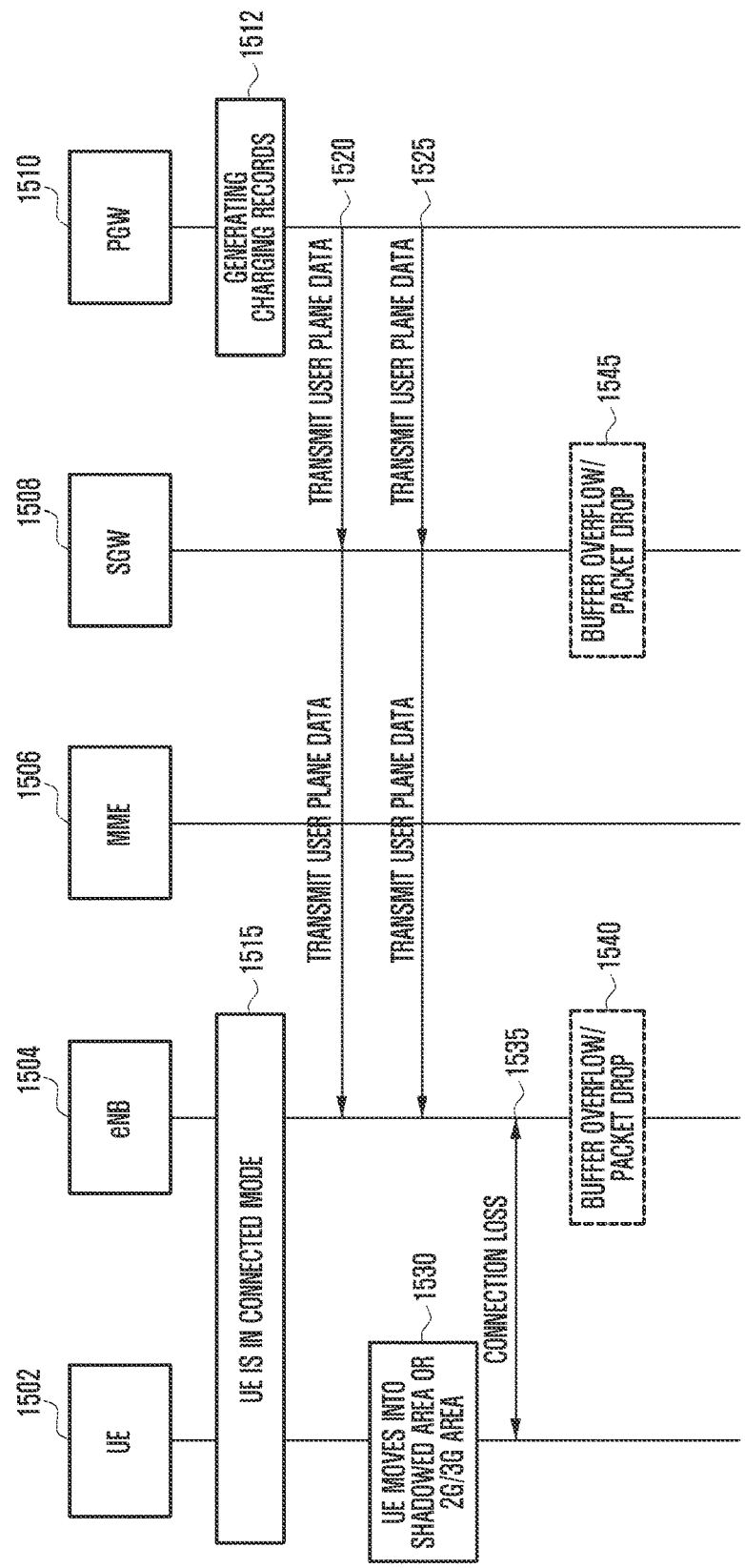
FIG. 15 illustrates a connection loss state between an eNB and a UE according to an embodiment of the present invention.

FIG. 15 illustrates a connection loss state between an eNB and a UE according to an embodiment of the present invention.

Referring to FIG. 15, according to an embodiment, a UE 1502, an eNB 1504, an MME 1506, an S-GW 1508, and a P-GW 1510 may transmit and receive signals to and from other entities.

According to an embodiment, the UE 1502 may receive a data packet from the eNB 1504 when a connection state between the UE 1502 and the eNB 1504 is achieved in step 1515.

In this instance, a downlink data packet is generated from a PDN (Packet Data Network) and transmitted to the P-GW 1510. In step 1512, the P-GW 1510 generates charging information about the received data packet, and then transmits the data packet to the S-GW 1508.

In at least one of steps 1520 and 1525, the S-GW 1508 that has received the data packets transmits the data packets to the connected eNB 1504 when the UE is in a connection mode. According to an embodiment, the data packet may be transmitted to the eNB through the MME 1506.

However, in step 1530, the UE 1502 may be moved either to the shadow area out of the connection mode, or to 2G/3G systems for voice services due to the fact that functions such as VoLTE, CSFB, and the like of the operator network are not supported. In this case, connection loss may occur between the UE 1502 and the eNB 1504 such as in step 1535.

In this instance, it may take time to detect the fact that the UE 1502 no longer transmits and receives data to and from the eNB 1504, and therefore the data packets may be continuously transmitted from the P-GW 1510 to the S-GW 1508 and the eNB 1502. When, due to this, buffer overflow or packet loss occurs in the S-GW 1508 or the eNB 1504 (step 1540 or step 1545), a case in which a user of the UE 1502 has to pay a fee for the packet which the UE 1502 fails to receive may occur.

In an embodiment of the present invention proposed to address the foregoing problem, when the UE 1502 no longer receives the data packet as in the above-described embodiment (when the UE 1502 detects an idle mode caused by a radio link failure or the like), it is possible to prevent charging information from being further generated and prevent the data packet which the UE 1502 fails to receive from being transmitted to the S-GW 1508 or the eNB 1504, by notifying even the core network including the S-GW 1508 and P-GW 1510 of this information indicating that the UE 1502 no longer receives the data packet.

Figure 16:
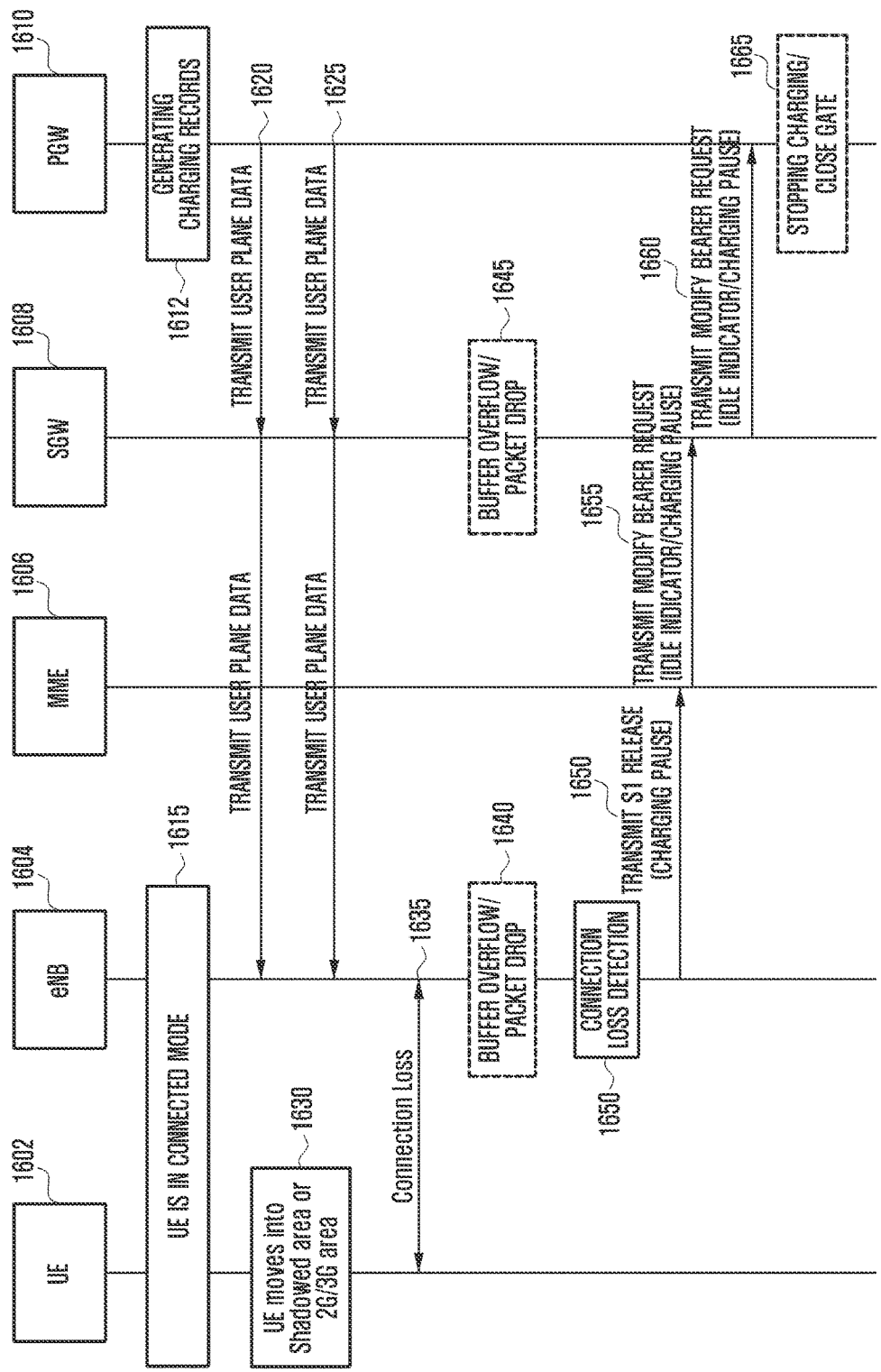
FIG. 16 illustrates a method of transmitting and receiving signals at the time of connection loss according to an embodiment of the present invention.

FIG. 16 illustrates a method of transmitting and receiving signals at the time of connection loss according to an embodiment of the present invention.

Referring to FIG. 16, according to an embodiment, a UE 1602, an eNB 1604, an MME 1606, an S-GW 1608, and a P-GW 1610 may transmit and receive signals to and from other entities.

In step 1615, when a connection state between the UE 1602 and the eNB 1604 is achieved, the UE 1602 may receive a data packet from the eNB 1604.

In this instance, a downlink data packet is generated from a PDN and transmitted to the P-GW 1610. In step 1612, the P-GW 1610 generates charging information about the received data packet and then transmits the generated data packet in at least one of steps 1620 and 1625 to the S-GW 1608, and the S-GW 1608 that has received the transmitted data packet transmits the data packets to the connected eNB 1604 when the UE is in a connection mode. According to an embodiment, the data packets may be transmitted to the eNB 1604 through the MME 1606.

However, in step 1630, the UE 1602 may be moved either to the shadow area out of the connection mode, or to 2G/3G systems for voice services due to a fact that functions such as VoLTE, CSFB, and the like of the operator network are not supported. In this case, connection loss may occur between the UE 1602 and the eNB 1604 such as in step 1635.

In this instance, it may take time to detect a fact that the UE 1602 no longer transmits and receives data to and from the eNB 1604, and therefore the data packets may be continuously transmitted from the P-GW 1610 to the S-GW 1608 and the eNB 1604.

In this case, such as in step 1640 or step 1645, buffer overflow or packet loss occurs in at least one of the S-GW 1608 or the eNB 1604.

In step 1650, the eNB 1604 may detect a fact that the connection to the UE 1602 is no longer available (in this instance, it can be seen through a case in which a reception response for a downlink packet transmitted by the eNB is not received from the UE within a predetermined time, or a case in which the foregoing case is repeated more than several times).

In this case, the eNB 1604 may transmit, to the MME 1606, at least one of information indicating that the UE 1602 is no longer in the connection mode and information indicating that charge imposition for the downlink on the UE 1602 should be prevented. According to an embodiment, the foregoing information may be transmitted to the MME 1606 through an S1 release request message.

In step 1660, when receiving the foregoing information from the eNB, the MME 1606 may transmit, to the S-GW 1608, a message including the information received in step 1655, and in this instance, a modify bearer request message may be used.

Meanwhile, in step 1665, when receiving the foregoing message, the S-GW 1608 may no longer transmit the data packet until receiving information indicating that the connection to the UE 1602 is available again, and transmit a message including the foregoing information to the P-GW 1610 per PDN connection or EPS bearer. According to an embodiment, the transmitted message may be transmitted up to the P-GW 1610 through the message such as the modify bearer request message. In this instance, the S-GW 1608 may transmit the foregoing information to all P-GWs 1610 in which the UE has the PDN connection.

In step 1670, when receiving the foregoing information, the P-GW 1610 may change a state concerning the downlink data packet of the UE 1602 to pause, and stop charge imposition. In addition, in order to prevent additional data packet loss, the P-GW 1610 may stop the data packet transmission before receiving a separate request from the S-GW 1608.

According to the above-described embodiment, when the connection to the UE 1602 becomes unavailable, the unavailable connection to the UE 1602 may be detected and notified to the core network, through which it is possible to prevent the occurrence of an additional charging error or the occurrence of data packet loss. According to an embodiment of the present invention, a technique that corrects, when an error (namely, a case in which a charge even for a packet that is not attempted to be transmitted is imposed on a user) occurs in the charging information due to the occurrence of the data packet loss, the error so that the charging information error may be minimize is proposed.

According to an embodiment, a node that generates the charging information (e.g., P-GW) may inspect a downlink packet transmitted to a user and thereby store information indicating that packets having what kind of packet ID (e.g., TCP sequence number) are transmitted to the UE, and inspect an acknowledgement transmitted by the UE and thereby determine what kind of packet is successfully transmitted to the UE. When the acknowledgement is not transmitted within a predetermined time even though the data packet has been transmitted to the UE, or when information indicating that the connection to the UE is no longer available or information indicating that charge imposition should be stopped is received, the P-GW may determine the occurrence of the data packet loss, and correct the charging information (namely, such as stopping charge imposition for the packet in which the acknowledgement is not detected).

Figure 17:
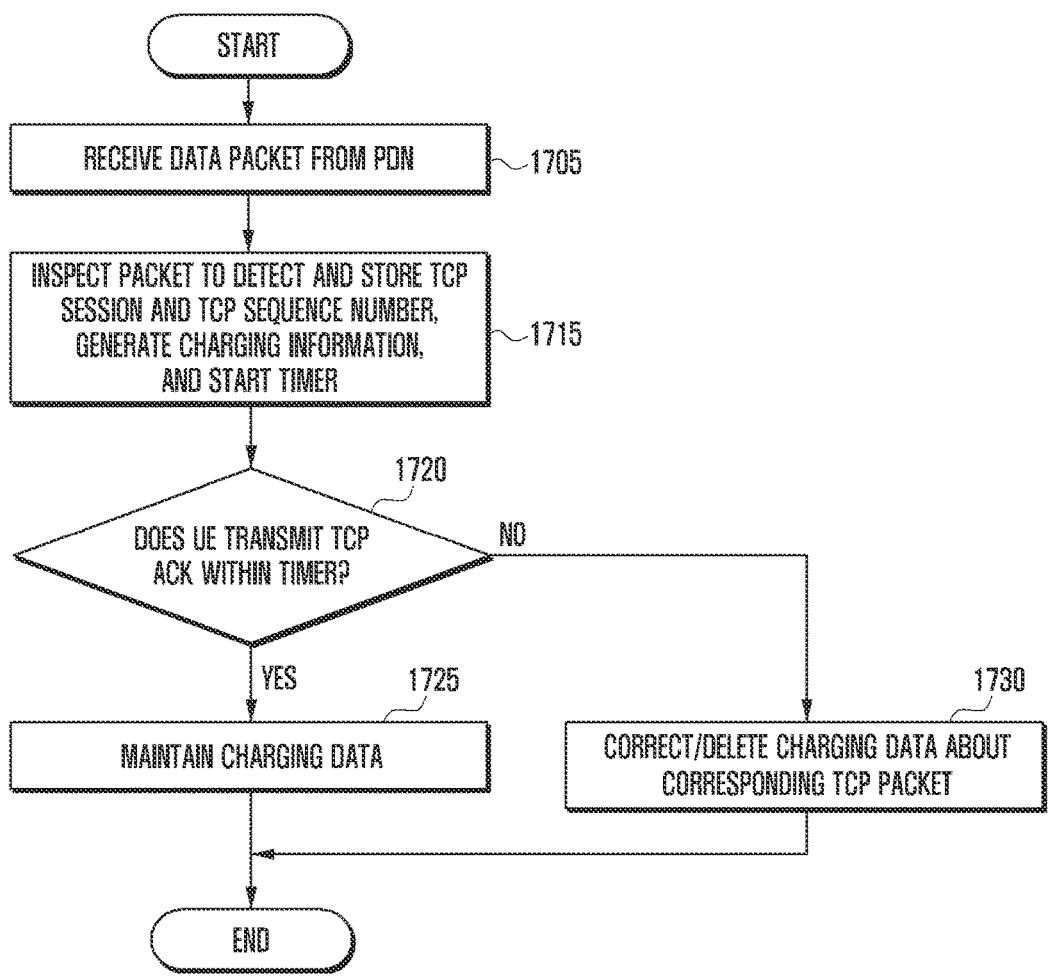
FIG. 17 is a flowchart illustrating operations of a core network node according to an embodiment of the present invention.

FIG. 17 is a flowchart illustrating operations of a core network node according to an embodiment of the present invention. More specifically, in FIG. 17, the operations of the core network node (e.g., P-GW) that manages charging information is illustrated.

Referring to FIG. 17, in step 1705, the P-GW may receive a data packet from a PDN.

In step 1715, the P-GW may determine to which TCP session or IP flow the corresponding data packet belongs using packet inspection. In this instance, whether to apply this process may be determined either based on a PCC rule received through a PCRF, or based on user bearer information received from the S-GW. The P-GW determines the TCP session/IP flow to which the packet belongs and a sequence number of TCP through the foregoing process, generates charging information, and starts a timer. The value of the timer may be determined by a value set in advance or variable setting.

In step 1720, the P-GW may determine whether an acknowledgement for the TCP transmitted by the UE has been transmitted within the value of the timer. According to an embodiment, when receiving the packet from the UE in a direction of the uplink, the P-GW may apply the packet detection in the same manner as the above description, and when matching occurs, for which downlink TCP packet the acknowledgement is completely received may be determined. For example, when the sequence number of the TCP packet detected by the P-GW is 1000 and the sequence number of a TCP ack packet transmitted to the same TCP session by the UE is 1001, this refers to the instance that the TCP packet having the sequence number up to 1000 has been successfully received. Whether the data packets of uplink/downlink belong to the same IP flow or TCP session may be determined using an IP transmission and reception address, a port number, or the like.

When it fails to recognize that the transmission of the downlink TCP packet is successfully performed within the time set in advance, the P-GW may determine that packet loss occurs in step 1730, and correct or delete charging information about the packet so that charge imposition for the packet that cannot be transmitted may be prevented.

According to an embodiment, when the transmission of the TCP packet is successfully performed, the P-GW may determine that the charging information is available and maintain the applied charging information in step 1725.

When information about whether the connection to the UE is available or charging stop information is applied as described in the above-described embodiment of the prevent invention, the P-GW transmits the data packet to the downlink and starts the timer. However, when failing to determine whether the packet transmission is successfully performed through uplink packet inspection, and when receiving information indicating that the connection to the UE is lost or information indicating that charge imposition should be stopped from the S-GW even before the timer is not completed yet, the P-GW may determine that packet loss occurs in the same manner as that in the above description, and correct and delete the charging information about the packet so that charge imposition for the packet that cannot be transmitted may be prevented.

In the foregoing embodiment, for convenience of description, a case in which the TCP is used has been used, but the embodiment of the present invention may be also applied to cases in which different kinds of protocols (e.g., UDP, RTP, etc.) are used.

In the above-described embodiments, each component may include a transmission/reception unit that transmits and receives data to and from the other components and a control unit that controls the transmission/reception unit and performs determination based on the data transmitted and received through the transmission/reception unit.

Those skilled in the art can appreciate that it is possible to implement the present invention in another specific form without changing the technical idea or the indispensable characteristics of the present invention. Accordingly, it should be understood that the embodiments described above are merely exemplary and are not limited. The scope of the present invention is defined by the appended claims to be described later, rather than the detailed description. Accordingly, it should be appreciated that all modifications or variations derived from the meaning and scope of the appended claims and their equivalents are included in the range of the present invention.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method by a packet data network gateway (PGW) in a mobile communication system, the method comprising:
   receiving, from a packet data network (PDN), a data packet for a terminal that supports a plurality of PDN connections;
   receiving, from a serving gateway (SGW), a modify bearer request including a PDN charging pause indication corresponding to a PDN connection among the plurality of PDN connections in case that a radio link associated with the terminal is released;
   pausing a PDN charging for any packet corresponding to the PDN connection upon receiving the PDN charging pause indication in case of the PDN connection in which packet drop being allowed; and
   discarding data packets associated with the PDN connection while the PDN charging is paused,
   wherein the PDN charging is paused per PDN connection among the plurality of PDN connections based on the PDN charging pause indication.

2. The method of claim 1, wherein the PDN charging pause indication includes an indication indicating start of the PDN charging pause.

3. A method by a serving gateway (SGW) in a mobile communication system, the method comprising:
   receiving, from a packet data network gateway (PGW), a data packet for a terminal that supports a plurality of packet data network (PDN) connections; and
   transmitting, to the PGW, a modify bearer request including a PDN charging pause indication corresponding to a PDN connection among the plurality of PDN connections,
   wherein the PDN charging for any packet corresponding to the PDN connection is paused upon receiving the PDN charging pause indication in case of the PDN connection in which packet drop being allowed,
   wherein the PDN charging is paused per PDN connection among the plurality of PDN connections based on the PDN charging pause indication,
   wherein data packets associated with the PDN connection are discarded at the SGW while the PDN charging is paused, and
   wherein the transmission of the modify bearer request is triggered in case that a radio link associated with the terminal is released.

4. The method of claim 3, wherein the PDN charging pause indication includes an indication indicating start of the PDN charging pause.

5. The method of claim 3, further comprising:
   generating the PDN charging pause indication based on information received from a base station.

6. An apparatus of a packet data network gateway (PGW) in a mobile communication system, the apparatus comprising:
   a transceiver; and a controller coupled with the transceiver and configured to:
  receive, from a packet data network (PDN), a data packet for a terminal that supports a plurality of PDN connections,
  receive, from a serving gateway (SGW), a modify bearer request including a PDN charging pause indication corresponding to a PDN connection among the plurality of PDN connections in case that a radio link associated with the terminal is released,
  pause a PDN charging for any packet corresponding to the PDN connection upon receiving the PDN charging pause indication in case of the PDN connection in which packet drop being allowed, and
  discard data packets associated with the PDN connection while the PDN charging is paused,
  wherein the PDN charging is paused per PDN connection among the plurality of PDN connections based on the PDN charging pause indication.

7. The apparatus of claim 6, wherein the PDN charging pause indication includes an indication indicating start of the PDN charging pause.

8. An apparatus of a serving gateway (SGW) in a mobile communication system, the apparatus comprising:
  a transceiver; and
  a controller coupled with the transceiver and configured to:
    receive, from a packet data network gateway (PGW), a data packet for a terminal that supports a plurality of packet data network (PDN) connections, and
    transmit, to the PGW, a modify bearer request including a PDN charging pause indication corresponding to a PDN connection among the plurality of PDN connections,
  wherein the PDN charging for any packet corresponding to the PDN connection is paused upon receiving the PDN charging pause indication in case of the PDN connection in which packet drop being allowed,
  wherein the PDN charging is paused per PDN connection among the plurality of PDN connections based on the PDN charging pause indication,
  wherein data packets associated with the PDN connection are discarded at the SGW while the PDN charging is paused, and
  wherein the transmission of the modify bearer request is triggered in case that a radio link associated with the terminal is released.

9. The apparatus of claim 8, wherein the PDN charging pause indication includes an indication indicating start of the PDN charging pause.

10. The apparatus of claim 8, wherein the controller is further configured to
  generate the PDN charging pause indication based on information received from a base station.

* * * * *